(12) United States Patent
Fung et al.

(10) Patent No.: US 10,706,821 B2
(45) Date of Patent: Jul. 7, 2020

(54) MISSION MONITORING SYSTEM

(71) Applicants: Henry H. Fung, San Diego, CA (US); Wayne S. Kim, San Diego, CA (US); Devang R. Parekh, San Diego, CA (US); Louis A. Oddo, Carlsbad, CA (US); Feng Cao, San Diego, CA (US); Michel Azar, San Diego, CA (US); Benjamin J. Montgomery, San Diego, CA (US)

(72) Inventors: Henry H. Fung, San Diego, CA (US); Wayne S. Kim, San Diego, CA (US); Devang R. Parekh, San Diego, CA (US); Louis A. Oddo, Carlsbad, CA (US); Feng Cao, San Diego, CA (US); Michel Azar, San Diego, CA (US); Benjamin J. Montgomery, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 597 days.

(21) Appl. No.: 15/047,301

(22) Filed: Feb. 18, 2016

(65) Prior Publication Data
US 2017/0243567 A1    Aug. 24, 2017

(51) Int. Cl.
*G09G 5/37*    (2006.01)
*G06T 15/20*    (2011.01)
(Continued)

(52) U.S. Cl.
CPC ........... *G09G 5/377* (2013.01); *G06F 3/0482* (2013.01); *G06F 3/04815* (2013.01);
(Continued)

(58) Field of Classification Search
CPC .. G08G 5/0091; G08G 5/0082; G08G 5/0052; G08G 5/0013; G08G 5/0026;
(Continued)

(56) References Cited

U.S. PATENT DOCUMENTS 6,266,068 B1    7/2001    Kang et al.
6,313,838 B1 *  11/2001   Deering ................. G06T 15/00
                                                            345/420

(Continued)

FOREIGN PATENT DOCUMENTS

WO            2013140401 A2    9/2013
WO    WO 2015/031281 A1    3/2015
WO    WO 2015/061363 A1    4/2015

OTHER PUBLICATIONS

Jordan "A Dynamically Linked Checkbox Matrix with Microsoft Excel", Aug. 26, 2013, https://optionexplicitvba.com/2013/08/26/a-dynamically-linked-checkbox-matrix-with-microsoft-excel/.*

(Continued)

*Primary Examiner* — Saptarshi Mazumder
(74) *Attorney, Agent, or Firm* — Tarolli, Sundheim, Covell & Tummino LLP

(57) ABSTRACT

One example includes a mission monitoring system. The system includes a data store configured to store map data associated with a geographic region of interest and a plurality of graphical elements corresponding to at least one mission asset and to mission constraints. Each of the plurality of graphical elements includes a layer assignment associated with one of a plurality of graphical layers. The system also includes a human-machine interface (HMI) configured to facilitate user inputs to selectively activate the plurality of graphical layers associated with the plurality of graphical elements and to display a graphical rendering of the selectively activated graphical layers superimposed over (Continued)

a graphical virtual environment of the geographic region of interest via a display system.

18 Claims, 8 Drawing Sheets

(51) Int. Cl.
*G09G 5/377* (2006.01)
*G08G 5/00* (2006.01)
*G06F 3/0481* (2013.01)
*G06F 3/0482* (2013.01)

(52) U.S. Cl.
CPC .......... *G06T 15/20* (2013.01); *G08G 5/0043* (2013.01); *G06T 2207/20104* (2013.01)

(58) Field of Classification Search
CPC ... G06T 19/00; G06T 17/05; G06F 17/30991; G06F 3/04845; G06F 3/04815; G06F 17/30241; G06F 3/0484; G06F 3/0482; G06F 3/041; G06F 3/04883; G06F 2203/04808; G09B 29/10; G09B 29/007; G01C 21/3638; G01C 21/32; G01C 21/3611; G01C 21/00; G01C 21/3682; G01C 21/3673; G01C 21/367; G01C 21/3626; G01C 21/3617; G01C 21/3664
See application file for complete search history.

(56) References Cited

U.S. PATENT DOCUMENTS

| | | | |
|---|---|---|---|
| 6,512,529 B1 | 1/2003 | Janssen et al. | |
| 8,291,460 B1 | 10/2012 | Peacock | |
| 8,766,984 B2 | 7/2014 | Mark et al. | |
| 2004/0254904 A1 | 12/2004 | Nelken et al. | |
| 2004/0267781 A1 | 12/2004 | Smolgovsky et al. | |
| 2008/0055318 A1 | 3/2008 | Glen | |
| 2009/0076665 A1 | 3/2009 | Hoisington et al. | |
| 2009/0326735 A1 | 12/2009 | Wood et al. | |
| 2010/0007669 A1 | 1/2010 | Bethune et al. | |
| 2010/0313146 A1 | 12/2010 | Nielsen et al. | |
| 2012/0019522 A1 | 1/2012 | Lawrence et al. | |
| 2012/0060177 A1* | 3/2012 | Stinson, III | H04N 21/4223 725/12 |
| 2012/0232939 A1 | 9/2012 | Pierre et al. | |
| 2013/0141642 A1 | 6/2013 | Wu et al. | |
| 2013/0325343 A1* | 12/2013 | Blumenberg | G01C 21/00 701/533 |
| 2014/0018979 A1* | 1/2014 | Goossen | G08G 5/0034 701/3 |
| 2016/0057032 A1* | 2/2016 | Tieftrunk | G01C 21/00 701/533 |

OTHER PUBLICATIONS

Nigam "Selecting / Deselecting all the CheckBoxes Inside a GridView", May 2008, https://www.codeproject.com/Articles/23256/Selecting-Deselecting-all-the-CheckBoxes-Inside-a.*
Bae Systems: "*GXP InMotion Video Analysis Suite*", 2014.
ESRI: "*Innovative GIS Technology in the Defense and Intelligence Communities*", 2007.
Hexagon Geospatial: "*Geomedia Motion Video Analysis Professional*", 2014.
Nguyen, et al.: "*Cloud-based distributed control of unmanned systems*" SPIE Defense+ Security. International Society for Optics and Photonics, 2015.
Textron Systems: "*RV4™ Remoteview™ Geospatial Analysis Software*"; found at: http://www.textronsystems.com/sites/default/files/pdfs/product-into/TS%20GS%Remote%20View%204_0.pdf
Walton, et al.: "*LiveLayer: Real-time Traffic Video Visualisation on Geographical Maps*"; found at: http://www.purdue.edu/discoverypark/vaccine/assets/pdfs/publications/pdf/Real-time%20Traffic%20Video%20Visualisation%20on%20Geographical%20Maps.pdf.
European Search Report for corresponding EP 17 15 5087, dated Sep. 5, 2017.
Baloogan: "Command Episode 4 Part 4 The Naval Bombardment—Command: Modern Air/Naval Operations", YouTube, Jan. 28, 2013, XP002771859, Retrieved from the Internet: URL: https://www.youtube.com/watch?v=yz4Mn_Njr-8 [retrieved on Jul. 6, 2017]; whole document.
Boston Myk: "Giving the Mig-21 a Fighting Chance in CMANO", YouTube, Jun. 7, 2015, XP002771860, retrieved from the internet: URL:ttps://www.youtube.com/watch?v=slrERHrzC1s [retrieved on Jul. 6, 2017]; whole document.
Anonymous: "How to show FPS in Starcraft 2", , Jul. 28, 2010 (Jul. 28, 2010), XP055670495, Retrieved from the Internet: URL:https:llosxdaily.coml2010071281show-starcraft-2-fpsl [retrieved on Feb. 20, 2020].
Engahomefps: StarCraft 2 4K OSR Replay FPS Test II Phenom II X4 965 BE YouTube, Oct. 5, 2014 (Oct. 5, 2014), pp. 1-1, XP054980246, Retrieved from the Internet: URL:https:IIwww.youtube.com1watch?v=AN4PiRXWeQ [retrieved on Feb. 21, 2020].
European Office Action for Application No. 17 155 087.4 dated Mar. 9, 2020.
United State Office Action corresponding to U.S. Appl. No. 14/992,572 dated Feb. 7, 2019.

* cited by examiner

MISSION MONITORING SYSTEM

TECHNICAL FIELD

The present disclosure relates generally to federated system management, and specifically to a mission monitoring system.

BACKGROUND

For many decades, aircraft have been implemented for a variety of uses as means of transportation, reconnaissance, and warfare. As some flight operations became increasingly more dangerous or tedious, unmanned aerial vehicles (UAV) have been developed as a means for replacing pilots in the aircraft for controlling the aircraft. UAVs have become more prevalent in missions, such that missions can typically be performed by a fleet of UAVs. Control of a fleet of UAVs can often require individual remote piloting of the UAVs. However, as processing capability has increased, UAVs can be programmed to perform mission objectives autonomously based on decision-making algorithms and the like. Additionally, for large and/or complex missions, UAVs are combined with other types of vehicles, both manned and unmanned, for performance of a given set of mission objectives. Thus, large federated systems across a variety of platforms can cooperate to perform the mission objectives, with the large federated system being controlled one or more locations via displays and human machine interfaces (HMIs).

SUMMARY

One example includes a mission monitoring system. The system includes a data store configured to store map data associated with a geographic region of interest and a plurality of graphical elements corresponding to at least one mission asset and to mission constraints. Each of the plurality of graphical elements includes a layer assignment associated with one of a plurality of graphical layers. The system also includes a human-machine interface (HMI) configured to facilitate user inputs to selectively activate the plurality of graphical layers associated with the plurality of graphical elements and to display a graphical rendering of the selectively activated graphical layers superimposed over a graphical virtual environment of the geographic region of interest via a display system Another example includes a method for displaying a mission. The method includes storing map data associated with a geographic region of interest and a plurality of graphical elements corresponding to a plurality of mission assets and assigning one of a plurality of graphical layers to each of the plurality of graphical elements. The method also includes facilitating user inputs via a layer manager to selectively activate the plurality of graphical layers via a selection matrix that is arranged to facilitate the selective activation of the plurality of graphical layers associated with each of a plurality of situational awareness features associated with each of the plurality of mission assets. The method further includes displaying a graphical rendering of the selectively activated graphical layers superimposed over a graphical virtual environment of the geographic region of interest via a display system.

Another example includes a mission monitoring system. The system includes a receiver configured to receive situational awareness data associated with at least one mission asset. The system also includes a data store configured to store map data associated with a geographic region of interest and a plurality of graphical elements corresponding to at least one mission asset, characteristics associated with the situational awareness data, and to mission constraints, wherein each of the plurality of graphical elements comprises a layer assignment associated with one of a plurality of graphical layers. The system further includes an HMI. The HMI includes a layer manager configured to facilitate user inputs to selectively activate the plurality of graphical layers associated with the plurality of graphical elements. The HMI also includes a display system configured to display a graphical rendering of the selectively activated graphical layers superimposed over a graphical virtual environment of the geographic region of interest. The HMI further includes a performance monitor configured as a histogram with respect to the graphical rendering rate of the display system to provide graphical feedback of the graphical rendering rate of the display system relative to at least one threshold associated with an acceptable range of operation of the display system based on the selective activation and deactivation of the plurality of graphical layers associated with the plurality of graphical elements.

DETAILED DESCRIPTION

Figure 1:
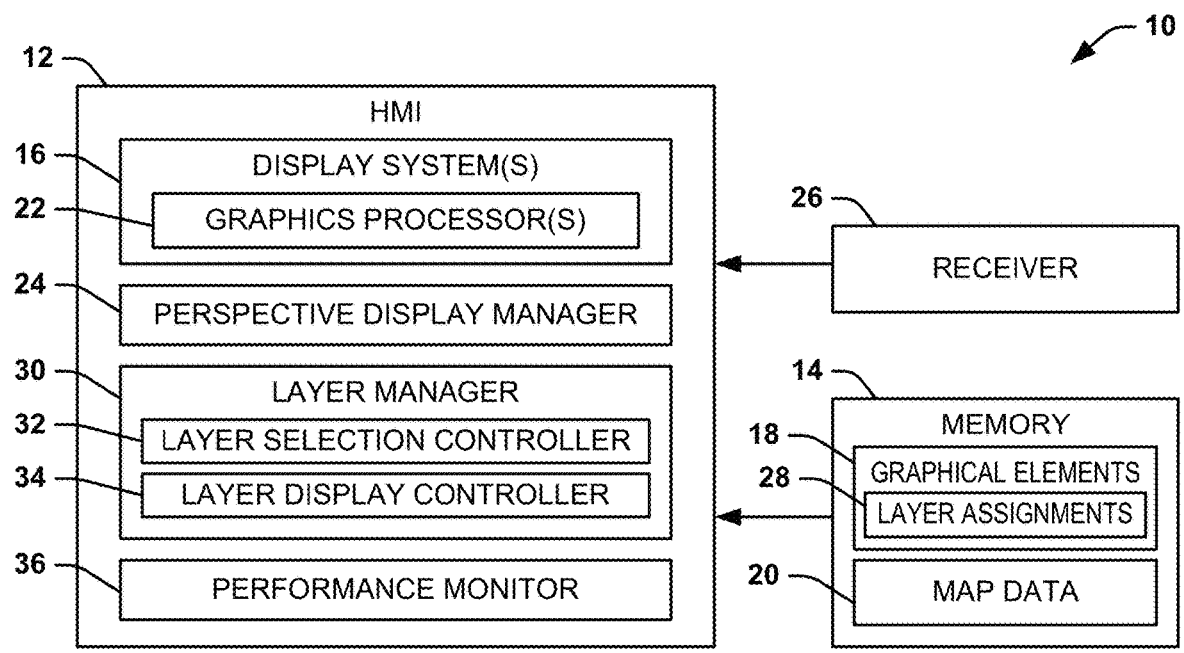
FIG. 1 illustrates an example of a mission monitoring system.

The present disclosure relates generally to federated system management, and specifically to a mission monitoring system. A mission monitoring system can serve as part of a control and monitoring architecture for a federated system to implement mission control of all aspects of a mission. The mission monitoring system can include a data store that is configured to store map data corresponding to a geographic region of interest and graphical elements corresponding to one or more mission assets, characteristics of the mission assets (e.g., routes, waypoints, and/or status), and mission constraints (e.g., weather, objectives, threats, terrain, etc.). Each of the graphical elements can have a graphical layer assigned to it in the data store, such that the mission asset(s), the characteristics of the mission asset(s), and the mission constraints can have be organized by separate graphical layers. As an example, the mission monitoring system can be configured to monitor simulated missions, or can monitor missions in real-time, such that the mission monitoring system can include a receiver configured to receive situational awareness data from the mission asset(s), which can be stored in the data store as location and status data (e.g., associated with the characteristics of the mission asset(s)).

The mission monitoring system also includes a human machine interface (HMI) with which the mission monitoring/control can be performed by one or more users. The HMI can include a layer manager that is configured to facilitate user inputs for selective activation of the graphical layers during the mission monitoring. The HMI also includes one or more display systems that are configure to provide graphical rendering of the selectively activated graphical layers superimposed over a graphical virtual environment. As a result, only the graphical elements corresponding to activated graphical layers are displayed on the display system(s). As a result, in response to a very large amount of information regarding a given mission being displayed on the display system(s), the user of the mission monitoring system can selectively activate only pertinent portions of the mission at a given time to de-clutter the display system(s), and thus allow focus of the users on only the pertinent aspects of the mission.

Additionally, the HMI can include a perspective display manager that is configured to facilitate changes to a perspective view in the graphical virtual environment. The perspective display manager can also facilitate multiple concurrent views of the graphical rendering of the selectively activated layers over the graphical virtual environment, and can allow a given perspective view to be saved (e.g., bookmarked) to allow subsequent access to the perspective view in real-time or a static perspective view of a given previous frame of the display system(s) at a previous time. Furthermore, the HMI can include a performance monitor that can display a real-time rendering rate of the display system(s) in a feedback manner, such as relative to a threshold. Therefore, a user can selectively activate and deactivate the graphical layers in response to the performance monitor, such as to maintain optimal display conditions associated with the display system(s).

FIG. 1 illustrates an example of a mission monitoring system 10. The mission monitoring system 10 can be implemented in a federated system management system to control a mission associated with a federated system. The mission monitoring system 10 can correspond to monitoring and/or management of a federated system that implements different sets of tools that collectively are tasked with accomplishing one or more mission objectives via one or more mission assets. The mission can be a simulated mission, such as to test mission scenarios in a simulated real-world environment, or can be an actual mission involving real-world conditions conducted in real-time. As an example, the mission assets can correspond to a variety of different physical mission assets that are implemented to provide specific actions to accomplish the mission objectives. For example, the mission assets can include manned assets, such as vehicles (e.g., airborne vehicles, terrestrial vehicles, and/or nautical vehicles) and/or personnel (e.g., soldiers, reconnaissance personnel, supporting personnel, etc.), as well as unmanned assets, such as satellites, unmanned aerial vehicles (UAVs), or other unmanned vehicles.

The mission monitoring system 10 includes a human-machine interface (HMI) 12 and a memory 14. As an example, the HMI 12 and memory 14 can be implemented together as part of a computer system, such as an enterprise server system, such as located at a tactical operations center (TOC), or can be implemented on a personal computer, laptop computer, or a wireless electronic device (e.g., a tablet computer or smartphone). The HMI 12 includes one or more display systems 16 that are configured to provide visual display of the mission, as described in greater detail herein, via one or more respective screens (e.g., monitors).

The memory 14 is demonstrated in the example of FIG. 1 as storing a set of graphical elements 18 and map data 20 that is associated with a geographic region of interest. As an example, the map data 20 can include geospatial map information, such as geospatial coordinate data, topological data, and/or other geospatial information. As an example, the map data 20 can be a commercially available map package, such as provided from any of a variety of third-party software providers. For example, the map data 20 can include Google Earth, World Wind, ArcGIS, and/or a variety of other commercially available geospatial map software programs.

In the example of FIG. 1, the display system(s) 16 include a respective one or more graphics processors 22 that are configured to provide graphical rendering of a graphical virtual environment of the geographic region of interest based on the map data 20. Thus, a user of the HMI 12 can implement a perspective display manager 24 to navigate through the graphical virtual environment via inputs. For example, the perspective display manager 24 enable the user to view the graphical virtual environment at a perspective view corresponding to a viewing perspective of the user at a given virtual location within the graphical virtual environment. As described herein, the term "perspective view" is defined as a viewing perspective of the user at a given virtual location and with a given viewing orientation within the graphical virtual environment. Therefore, the display system(s) 16 can simulate that which a user can see in the graphical virtual environment from the given virtual location within the graphical virtual environment based on the virtual location and based on an orientation of the user with respect to the virtual location. Accordingly, at a given virtual location in the graphical virtual environment, the user can change a viewing orientation to "see" in 360° in both azimuth and polar angles in a spherical coordinate system from a given virtual location in the graphical virtual environment. Additionally, as described in greater detail herein, the perspective display manager 24 can enable viewing the graphical virtual environment at a plurality of perspective views on a respective plurality of display systems 16.

The graphical elements 18 can correspond to the mission asset(s), as well as characteristics associated with the mission asset(s) such as route, waypoints, and/or status information. In the example of FIG. 1, the mission monitoring system 10 also includes a receiver 26 that is configured to receive situational awareness data provided from the mission asset(s) in real-time. Therefore, the status information can be stored in the memory 14 and updated in real-time based on the situational awareness data that is received via the receiver 26, and can be provided as a graphical element 18. For example, the status information can correspond to a tag that can correspond to a given one of the mission asset(s) and can be displayed via the display system(s) 16. Additionally, the graphical elements 18 can include mission constraints corresponding to any of a variety of external factors associated with conditions of the mission and/or mission objectives. As an example, the mission constraints can include data associated with weather conditions in the geographic region of interest in which the mission takes place, information about the topology or other physical environmental conditions associated with the geographic region of interest, information about known threats, such as including range of weaponry, line of sight, reaction time, or a variety of other known information, and/or information regarding mission objectives. Thus, each of the mission constraints can have an associated graphical element 18 that can be implemented to represent the respective mission constraint on the display system(s) 16.

In the example of FIG. 1, each of the graphical elements 18 can have an associated graphical layer assignment 28. The graphical layer assignments 28 can each correspond to a graphical layer that can be selectively activated to be displayed via the display system(s) 16. Thus, the graphical elements 18 that are assigned to a graphical layer via the graphical layer assignments 28 that is activated are displayed on the display system(s) 16, such that the graphics processor(s) 22 can superimpose the graphical elements 18 of the activated layers onto the graphical virtual environment of the geographic region of interest. Conversely, the graphical elements 18 that are assigned to a graphical layer via the graphical layer assignments 28 that is deactivated are not displayed on the display system(s) 16.

In the example of FIG. 1, the HMI 12 includes a layer manager 30 configured to facilitate user inputs for the selective activation and deactivation of the graphical layers associated with the graphical elements 18. Thus, the user(s) can provide inputs via a layer selection controller 32 to selectively activate and deactivate the graphical layers for the corresponding selective display of the graphical elements 18 via the display system(s) 16. As an example, the layer selection controller 32 can operate to provide selective activation and deactivation of the graphical layers 32 for all of the display system(s) 16, or can provide separate control of the selective activation and deactivation of the graphical layers for each of a plurality of display systems 16. As a result, a layer display controller 34 associated with the layer manager 30 can operate as a filter for the deactivated graphical layers, such that the graphical elements of the deactivated layers are not provided to the graphics processor(s) 22 to be superimposed onto the graphical virtual environment of the geographic region of interest. In addition, the HMI 12 includes a performance monitor 36 that is configured to monitor a rendering rate of the display system(s) 16 in a feedback manner, such that the selective activation and deactivation of the graphical layers associated with the graphical elements 18 can be implemented to maximize the rendering rate of the display system(s) 16 to ensure sufficient updating of the display system(s) 16 during real-time monitoring of a mission.

Figure 2:
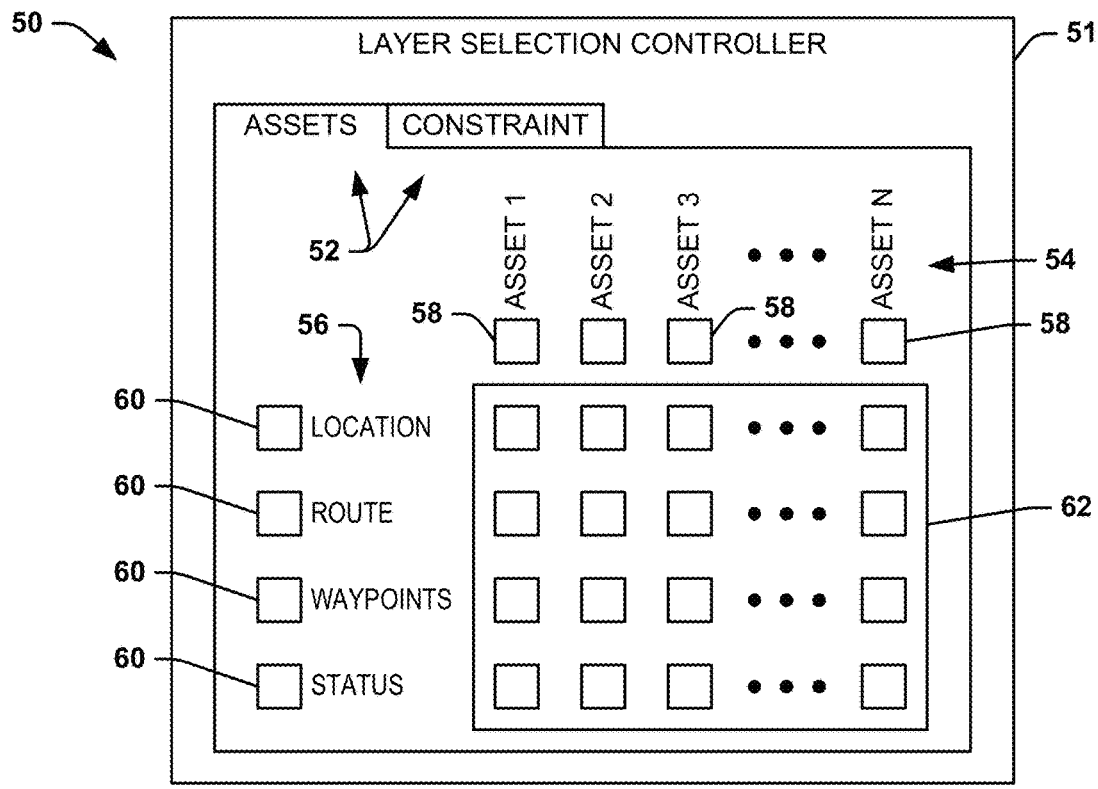
FIG. 2 illustrates an example diagram of a layer selection controller.

FIG. 2 illustrates an example diagram 50 of a layer selection controller 51. The layer selection controller 51 can be a graphical interface corresponding to the layer selection controller 32 in the example of FIG. 1. For example, the layer selection controller 51 can be displayed by the display system(s) 16 on the HMI 12 as part of a graphical user interface (GUI). Therefore, reference is to be made to the example of FIG. 1 in the following description of the example of FIG. 1.

The layer selection controller 51 is demonstrated as including two tabs 52 at the top of the layer selection controller 51, demonstrated in the example of FIG. 2 as an "ASSETS" tab and a "CONSTRAINT" tab. In the example of FIG. 2, the "ASSETS" tab 52 is selected to display a layer selection interface of a plurality N of mission asset fields 54, demonstrated as "ASSET 1" through "ASSET N" where N is a positive integer, and a set of mission asset characteristic fields 56. As an example, the mission asset fields 54 can correspond to a variety of mission assets, such as manned asset vehicles (e.g., airborne vehicles, terrestrial vehicles, and/or nautical vehicles) and/or personnel (e.g., soldiers, reconnaissance personnel, supporting personnel, etc.), as well as unmanned asset vehicles (e.g., satellites, unmanned aerial vehicles (UAVs), or other unmanned vehicles). The mission asset fields 54 can be organized in the layer selection controller 51 by squadron, fleet, type, or any of a variety of other different manners of organization that can be provided in the layer selection controller 51 in a static or dynamic manner. Each of the mission assets associated with the mission asset fields 54 can have a predetermined graphical element 18 associated with it, such as stored in the memory 14. Thus, the graphical elements 18 corresponding to respective mission assets can be graphically demonstrated as superimposed over the graphical virtual environment via the display system(s) 16, as described in greater detail herein.

The mission asset characteristic fields 56 are demonstrated as "LOCATION", "ROUTE", "WAYPOINTS", and "STATUS". As an example, the "LOCATION" characteristic field 56 can correspond to a graphical representation of a respective one of the mission assets at a specific location in the graphical virtual environment corresponding to an actual real-world location of the respective one of the mission assets. The "ROUTE" characteristic field 56 can correspond to a planned route (e.g., a planned flight path) on which the mission asset is intended to travel, such as provided via user inputs to the HMI 12. The "WAYPOINTS" characteristic field 56 can correspond to portions of the planned route at which action is to be taken by the mission asset, such as changing direction, dwelling in place, launching ordnance, or a variety of other actions that can be taken by the mission asset for completion of the mission objectives. The "STATUS" characteristic field 56 can correspond to any of a variety of status conditions associated with the respective mission asset, such as ammunition, fuel, damage, distress, or any of a variety of other conditions associated with the respective mission asset. As an example, at least a portion of the mission asset characteristics associated with the mission asset characteristic fields 56 can be ascertained via the receiver 26, and can be stored and updated in the memory 14. As another example, each of the characteristics of the mission assets associated with the mission asset characteristic fields 56 can have a predetermined graphical element 18 associated with it, such as stored in the memory 14. Thus, the graphical elements 18 corresponding to respective mission asset characteristics can be graphically demonstrated as superimposed over the graphical virtual environment via the display system(s) 16, as described in greater detail herein.

In the example of FIG. 2, each of the mission asset fields 54 has an associated selection box 58 and each of the mission asset characteristic fields 56 has an associated selection box 60. Additionally, the layer selection controller 51 includes a selection matrix 62 that includes a plurality of selection boxes that are each associated with a respective one of the mission asset fields 54 and a respective one of the mission asset characteristic fields 56. The selection boxes 58, the selection boxes 60, and the selection matrix 62 can thus allow selective activation and deactivation of the graphical layers associated with the mission assets and the mission asset characteristics associated with the mission asset fields 54 and the mission asset characteristic fields 56. The selection boxes 58 and 60 can facilitate selection or de-selection of multiple selection boxes of the selection matrix 62, such as selection or de-selection of a respective row or column of the selection matrix 62, and thus single-click selection or de-selection of a plurality of the selection boxes of the selection matrix 62. Additionally, the selection matrix 62 facilitates selection or de-selection of a single selection box of the selection matrix 62, such as to select or de-select one mission asset characteristic of a respective one mission asset.

As an example, in response to the user selecting or de-selecting one of the selection boxes 58, such as via a mouse-click, a touch-input, or any of a variety of other input means, all of the selection boxes in the corresponding row of the selection matrix 62 can likewise become selected or de-selected. Therefore, the user can select or de-select a given one of the mission asset characteristics of all of the mission assets. Similarly, in response to the user selecting or de-selecting one of the selection boxes 60, all of the selection boxes in the corresponding column of the selection matrix 62 can likewise become selected or de-selected. Therefore, the user can select or de-select all of the mission asset characteristics of a given one of the mission assets. In addition, the user can selectively activate or deactivate a given mission asset characteristic associated with a respective one mission asset by individually interacting with the selection boxes of the selection matrix 62. Therefore, the user can provide single-click access to multiple or individual selection boxes of the selection matrix 62.

Each of the mission asset characteristics can correspond to a separate respective graphical element 18 that can be displayed via the display system(s) 16. Therefore, by interacting with the selection boxes 58, the selection boxes 60, and the selection matrix 62 of the layer selection controller 51, users of the mission management system 10 can control the display of the graphical layers that are superimposed over the graphical virtual environment of the geographic region of interest. The "ASSETS" tab 52 thus allows selective activation and deactivation of the graphical layers to be displayed via the display system(s) 16 by the graphics processor(s) 22. However, while the layer selection controller 51 provides a manner of selectively activating and deactivating the graphical layers, it is to be understood that the graphical layers can be selectively activated and deactivated in other ways. For example, a given graphical layer can be deactivated simply by providing a quick input to one of the graphical elements 18 (e.g., a right-click) to quickly deactivate the corresponding graphical layer.

Figure 3:
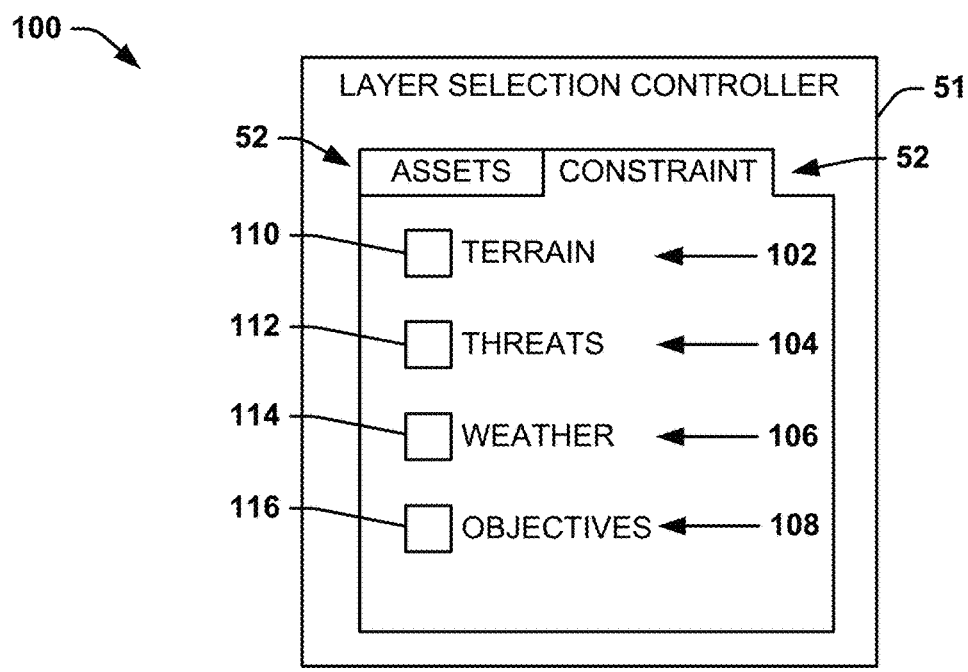
FIG. 3 illustrates another example diagram of a layer selection controller.

FIG. 3 illustrates another example diagram 100 of the layer selection controller 51. Similar to as described previously, the layer selection controller 51 can be a graphical interface corresponding to the layer selection controller 32 in the example of FIG. 1, such as displayed by the display system(s) 16 on the HMI 12 as part of a GUI.

In the example of FIG. 3, the "CONSTRAINT" tab 52 is selected to display a layer selection interface of a plurality of mission constraints. In the example of FIG. 3, the mission constraints are represented by a set of mission constraint fields. As an example, the mission constraints can correspond to any of a variety of external factors associated with conditions of the mission and/or mission objectives. In the example of FIG. 3, the mission constraint fields are demonstrated as a "TERRAIN" constraint field 102, a "THREATS" constraint field 104, a "WEATHER" constraint field 106, and an "OBJECTIVES" constraint field 108.

As an example, the "TERRAIN" characteristic field 102 can correspond to a graphical representation of the topology, terrain, and/or physical structures (e.g., both natural and man-made) of the geographic region of interest. As an example, the data associated with the topology, terrain, and/or physical structures of the geographic region of interest can be provided via the map data 20. The "THREATS" characteristic field 104 can correspond to a location of known threats and/or obstacles with which the mission assets can interact in the geographic region of interest. For example, the threats/obstacles can correspond to enemy troops, vehicles, emplacements, obstacles, or other objects that can be deemed threatening to the mission assets. In addition, the "THREATS" characteristic field 104 can also correspond to threat/obstacle data associated with real-time interactive states of the threats/obstacles in the graphical virtual environment, such as with respect to the mission assets. For example, the threat/obstacle data can include speed, range, line of sight, or other known characteristics of a given threat that can be visually displayed via the display system(s) 16. As an example, data regarding the location of threats/obstacles can be received via the situational awareness data associated with one or more of the mission assets, such as via input data, photographs, satellite imagery, or any of a variety of ways determining a location of the threats/obstacles, and can be stored in the memory 14. Additionally, data regarding the threat/obstacle data (e.g., speed, range, line of sight, or other known characteristics of a given threat) can be provided via a database of known characteristics of the associated threats, and can be stored in the memory 14.

As an example, the "WEATHER" characteristic field 106 can correspond to known weather conditions in the geographic region of interest, such as can be visually demonstrated on the display system(s) 16. As an example, the known weather conditions can be provided via environment data, such as provided via one or more external databases. For example, the environment data can be provided from online sources, weather service databases, or a variety of other sources that can provide dynamic environmental conditions. The environment data can thus correspond to weather conditions, such as including precipitation, visibility conditions, humidity, temperature, air pressure, or any of a variety of other conditions that can affect the performance of the mission assets. The "OBJECTIVES" characteristic field 108 can correspond to one or more mission objectives that can be accomplished via the mission assets. For example, the mission objectives can be associated with one or more other components that can be displayed via the display system(s) 16, such as the threats/obstacles, such that the mission objectives can be graphically marked separately from the other displayed components, or such that the display of the components can be augmented to denote status as a mission objective.

Figure 4:
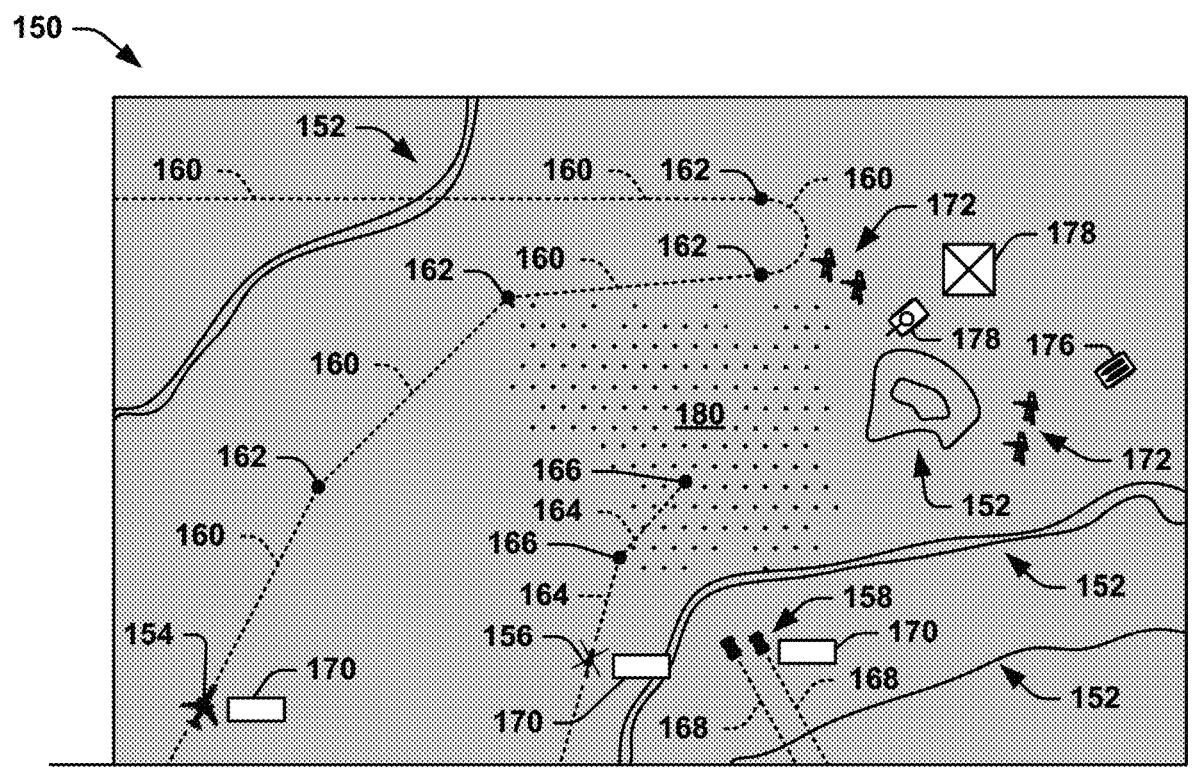
FIG. 4 illustrates an example diagram of a mission map.

In the example of FIG. 3, each of the fields 102, 104, 106, and 108 has an associated respective selection box 110, 112, 114, and 116. The selection boxes 110, 112, 114, and 116 can thus allow selective activation and deactivation of the graphical layers associated with the mission constraints corresponding to the characteristic fields 102, 104, 106, and 108. Each of the mission constraints associated with the characteristic fields 102, 104, 106, and 108 can correspond to one or more separate respective graphical layers that can be displayed via the display system(s) 16. Therefore, by interacting with the selection boxes 110, 112, 114, and 116 of the layer selection controller 51, users of the mission management system 10 can control the display of the graphical layers that are superimposed over the graphical virtual environment of the geographic region of interest. The "CONSTRAINTS" tab 52 thus allows selective activation and deactivation of graphical layers to be displayed via the display system(s) 16 by the graphics processor(s) 22 of the mission constraints associated with aspects of the mission with which the mission assets can interact. While the "CONSTRAINTS" tab 52 demonstrates only single selection boxes 110, 112, 114, and 116 for the respective fields 102, 104, 106, and 108, it is to be understood that each of the fields 102, 104, 106, and 108 can include sub-constraints, and thus additional organization of the fields 102, 104, 106, and 108 and respective selection boxes 110, 112, 114, and 116. Additionally, similar to as described previously regarding the example of FIG. 2, the graphical layers are not limited to the example of FIG. 3 for the selective activation and deactivation. For example, a given graphical layer can be deactivated simply by providing a quick input to one of the graphical elements 18 (e.g., a right-click) to quickly deactivate the corresponding graphical layer FIG. 4 illustrates an example diagram 150 of a mission map 151. The diagram 150 demonstrates a graphical virtual environment of the geographic region of interest. In the example of FIG. 4, the diagram 150 demonstrates a single perspective view of the mission map 151 that can be displayed via the display system(s) 16. In the example of FIG. 4, reference is to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device. As an example, the mission map 151 can correspond to superimposition of separate respective graphical layers that are superimposed over a graphical virtual environment. As an example, the graphical virtual environment can be a graphically rendered representation of the geographic region of interest, or can be a still photograph or real-time video of the geographic region of interest. Thus, the graphical layers can correspond to display of mission assets, characteristics of the mission assets, and mission constraints that are superimposed over the graphical virtual environment, such as displayed as pre-programmed graphical elements or pre-programmed augmentations to real-time video data.

In the example of FIG. 4, the diagram 150 demonstrates a three-dimensional topographical map on which graphical elements 18 are superimposed over the graphical virtual environment. For example, the three-dimensional topographical map can be provided via the map data 20 stored in the memory 14. For example, the map data 20 can provide at a minimum, coordinate data associated with the geographic region of interest, such that the coordinate data can be translated to the graphical virtual environment. Additionally, the graphical elements 18 can have been accessed from the memory 14 to be provided as superimposed over the graphical virtual environment at the appropriate locations according to the coordinate data based on the selective activation and deactivation of the graphical layers, such as described previously in the examples of FIGS. 2 and 3.

The mission map 151 is demonstrated as including topographical features 152 to provide details of the associated environment. As an example, the topographical features 152 can correspond to a mission constraint graphical layer. For example, the topographical features 152 can be provided via the map data 20 stored in the memory 14. As an example, a user of the mission monitoring system 10 can selective the "TERRAIN" constraint field 102 in the "CONSTRAINTS" tab 52 of the layer selection controller 51 to activate the terrain graphical layer. Therefore, the graphics processor(s) 22 can receive the data associated with the topographical features 152, such as graphical information and location data, and can superimpose the topographical features over the graphical virtual environment at the appropriate locations in the graphical virtual environment corresponding to the respective locations in the geographic region of interest.

The diagram 150 includes a plurality of mission assets that are demonstrated on the mission map 151. In the example of FIG. 4, the diagram 150 demonstrates an aircraft 154 (e.g., a UAV), a helicopter 156 (e.g., manned or unmanned), and two ground vehicles 158. The aircraft 154, the helicopter 156, and the ground vehicles 158 can each correspond to separate respective mission assets. Thus, each of the aircraft 154, the helicopter 156, and the ground vehicles 158 can be associated with a respective one of the mission asset fields 54 in the layer selection controller 51. The position of the aircraft 154, the helicopter 156, and the ground vehicles 158 can be provided and updated in real-time via situational awareness data (e.g., as provided via the receiver 26).

In the example of FIG. 4, the aircraft 154 includes a graphically demonstrated flight-path 160 that demonstrates where the path on which the aircraft 154 has already flown and along which the aircraft 154 is intended to fly. The flight-path 160 can have been designated via control inputs, and includes a series of waypoints 162 at which the flight-path 160 changes. The flight-path 160 can thus demonstrate a path along which the aircraft 154 can fly to perform a mission operation (e.g., launch ordnance, capture photographs, etc.). As an example, the waypoints 162 can have been dynamically provided via control inputs, with one of the waypoints 162 corresponding to a time and/or location of the aircraft 154 at which the aircraft 154 is intended to perform the mission operation. Similar to the aircraft 154, the helicopter 156 likewise is demonstrated as flying along a flight path 164 with waypoints 166, and the ground vehicles 158 are also demonstrated as having routes 168 similar to the flight paths 160 and 164. In addition, each of the aircraft 154, the helicopter 156, and the ground vehicles 158 include a tag 170. The tags 170 can correspond to additional situational awareness, such as corresponding to one of a variety of different status conditions of the aircraft 154, the helicopter 156, and the ground vehicle 158, respectively. As an example, the situational awareness data can be received via the receiver 26. For example, the tags 170 can be expanded from a minimized state (e.g., to minimize overlap of the tags 170 with respect to the display of the mission map 151) to demonstrate the additional information regarding the aircraft 154, the helicopter 156, and the ground vehicle 158, respectively.

The diagram 150 also demonstrates a plurality of threats that are demonstrated on the mission map 151. In the example of FIG. 4, the diagram 150 demonstrates ground forces 172, a first vehicle 174, and a second vehicle 176. As an example, the ground forces 172 and the vehicles 174 and 176 can have been identified by a mission asset, such as a satellite, or by one of the aircraft 154, the helicopter 156, and the ground vehicle 158, such that the location, speed, and information regarding the ground forces 172 and the vehicles 174 and 176 can be provided to the mission monitoring system 10 via situational awareness data received at the receiver 26. For example, the situational awareness data can also include identification information regarding the threats. Thus, additional information regarding the threats can be accessed, such as from a database (e.g., the memory 14), in response to the identification information. For example, upon identifying the vehicles 174 and 176, data regarding the speed, weapon range, line of sight, or other known characteristics of the vehicles 174 and 176 can be accessed. Such information can also be depicted on the mission map 151, such as visually or in a text format (e.g., similar to the tags 170).

In addition, the diagram 150 also demonstrates an objective 178, which is demonstrated in the example of FIG. 4 as a building. As an example, the objective 178 can be provided as part of the map data 20, or can be identified via the situational awareness data received at the receiver 26. Furthermore, the diagram 150 includes a weather condition 180, which is demonstrated in the example of FIG. 4 as a pattern of dots. As an example, the weather condition 180 can correspond to fog, rain, or any of a variety of other weather conditions. For example, the weather condition 180 can be provided from online sources, weather service databases, or a variety of other sources that can provide dynamic environmental conditions. While the weather condition 180 is demonstrated in the example of FIG. 4 as a pattern of dots, it is to be understood that the weather condition can be depicted in a variety of different ways, such as based on color shading or other visual manners that do not occlude details of the mission map 151.

Each of the mission asset characteristics associated with the mission assets, including the aircraft 154, the helicopter 156, and the ground vehicles 158 can correspond to a separate respective graphical element 18 that can be displayed on the mission map 151 via the display system(s) 16. For example, the graphical representation and location of each of the aircraft 154, the helicopter 156, and the ground vehicles 158 can be assigned to separate respective layers, the flight paths 160 and 164 and the routes 168 can be assigned to separate respective layers, the waypoints 162 and 166 can be assigned to separate respective layers, and each of the tags 170 can be assigned to separate layers with respect to each other. Therefore, by interacting with the selection boxes 58, the selection boxes 60, and the selection matrix 62 in the "ASSETS" tab 52 of the layer selection controller 51, users of the mission management system 10 can control the display of the graphical layers that are superimposed over the graphical virtual environment of the geographic region of interest demonstrated on the mission map 151. Therefore, the diagram 150 of the mission map 151 demonstrates that all of the graphical layers associated with the mission assets in the "ASSETS" tab 52 have been activated.

Similarly, each of the mission constraints, including the topographical features 152, the ground forces 172, the vehicles 174 and 176, the objective 178, and the weather condition 180, can correspond to a separate respective graphical element 18 that can be displayed on the mission map 151 via the display system(s) 16. For example, each of the topographical features 152, the ground forces 172, the vehicles 174 and 176, the objective 178, and the weather condition 180 can be assigned to separate respective layers with respect to each other. Therefore, by interacting with the selection boxes 110, 112, 114, and 116 in the "CONSTRAINTS" tab 52 of the layer selection controller 51, users of the mission management system 10 can control the display of the graphical layers that are superimposed over the graphical virtual environment of the geographic region of interest demonstrated on the mission map 151. Therefore, the diagram 150 of the mission map 151 demonstrates that all of the graphical layers of the mission constraints in the "CONSTRAINTS" tab 52 have been activated.

Figure 5:
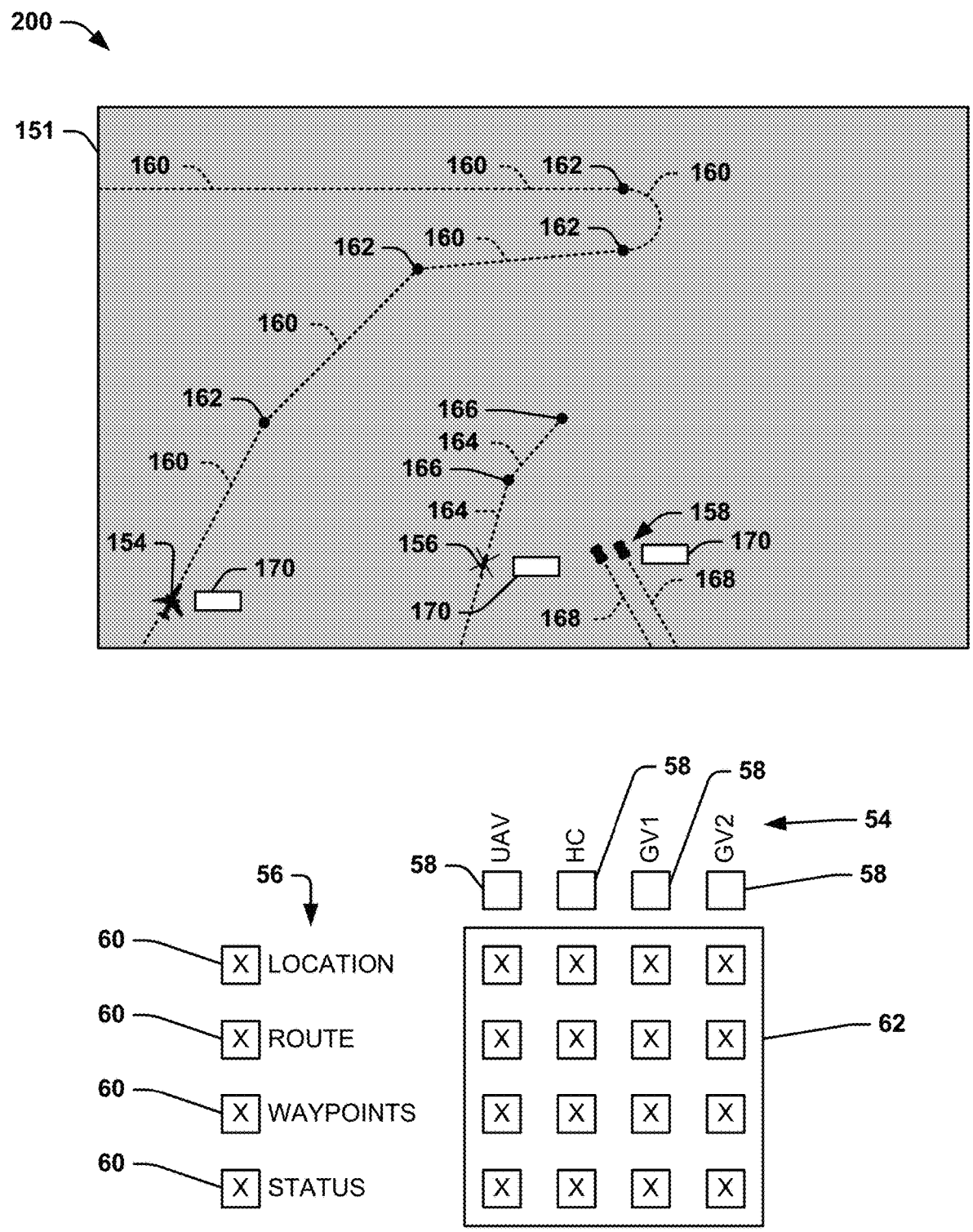
FIG. 5 illustrates another example diagram of a mission map.

FIG. 5 illustrates another example diagram 200 of the mission map 151. The diagram 200 demonstrates a graphical virtual environment of the geographic region of interest. In the example of FIG. 5, the diagram 200 demonstrates a single perspective view of the mission map 151 that can be displayed via the display system(s) 16. The mission map 151 can correspond to the mission map 151 demonstrated in the diagram 150 of the example of FIG. 4, and thus reference is likewise to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device.

The diagram 200 includes a portion of the layer selection controller 51, in which the "ASSETS" tab 52 has been selected to display the layer selection interface of the mission asset fields 54, demonstrated as "UAV" to correspond to the aircraft 154, as "HC" to correspond to the helicopter 156, and as "GV1" and "GV2" to correspond to each of the two ground vehicles 158, and to display the set of mission asset characteristic fields 56. In the example of FIG. 5, the selection box 60 of each of the mission asset characteristic fields 56 has been selected, as indicated by the "X" in each of the selection boxes 60. As a result of the single-click selection of each individual one of the selection boxes 60, the selection boxes of the selection matrix 62 are also automatically selected. Accordingly, in the example of FIG. 5, the graphical layers associated with each of the mission asset characteristics of all of the mission assets are selected. In addition, in the example of FIG. 5, none of the selection boxes 110, 112, 114, and 116 associated with the mission constraints in the "CONSTRAINTS" tab 52 has been selected.

Therefore, in the example of FIG. 5, the diagram 200 demonstrates that the mission assets and the mission asset characteristics are depicted on the mission map 151 via the display system(s) 16. Thus, the diagram 200 depicts the aircraft 154, the helicopter 156, and the two ground vehicles 158 based on the selection box 60 of the "LOCATION" mission asset characteristic field 56 having been selected for display of the respective graphical layers. Similarly, the diagram 200 also depicts the flight-path 160 associated with the aircraft 154, the flight-path 164 associated with the helicopter 156, and the routes 168 associated with the ground vehicles 158 based on the selection box 60 of the "ROUTE" mission asset characteristic field 56 having been selected for display of the respective graphical layers. Similarly, the diagram 200 also depicts the waypoints 162 associated with the aircraft 154 and the waypoints 166 associated with the helicopter 156 based on the selection box 60 of the "WAYPOINTS" mission asset characteristic field 56 having been selected for display of the respective graphical layers. Furthermore, the diagram 200 also depicts the tags 170 associated with the aircraft 154, the helicopter 156, and the ground vehicles 158 based on the selection box 60 of the "STATUS" mission asset characteristic field 56 having been selected for display of the respective graphical layers.

While the example of FIG. 5 demonstrates single-click selection of each individual one of the selection boxes 60, it is to be understood that the selection boxes of the selection matrix 62 can be alternatively automatically selected based on single-click selection of each individual one of the selection boxes 58. Additionally, it is to be understood that the mission asset characteristics defined by the mission asset characteristic fields 56 can be individually selected via the selection boxes of the selection matrix 62, or can be selectively de-selected after a single-click selection of one or more of the selection boxes 58 or 60 to selectively activate and deactivate the corresponding graphical layers. Additionally, the "ASSETS" tab 52 can also include a single selection box to provide single-click selection and de-selection of all of the selection boxes in the selection matrix 62. Thus, the selection and de-selection of the selection boxes in the selection matrix 62 can be implemented in a variety of ways.

Figure 6:
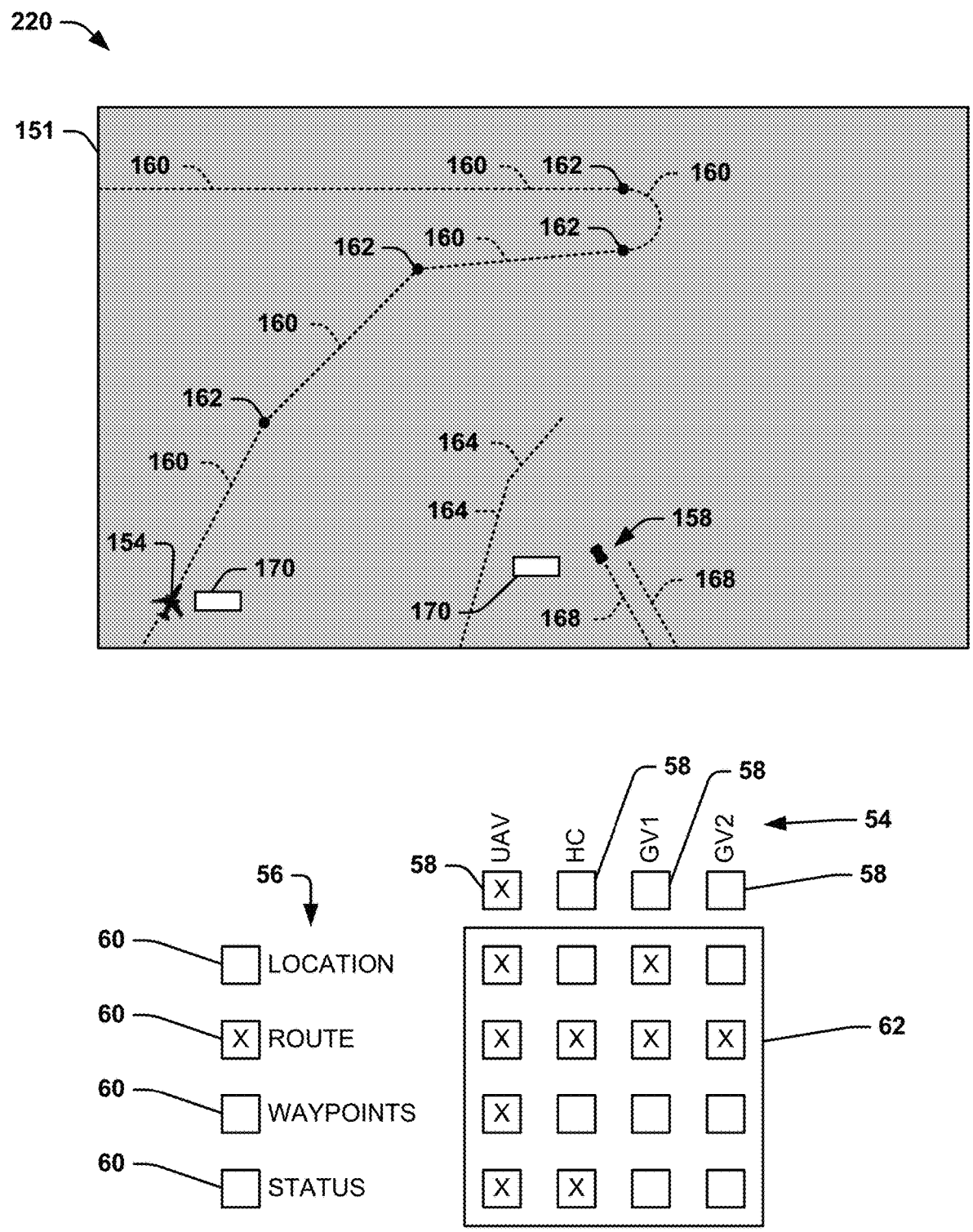
FIG. 6 illustrates yet another example diagram of a mission map.

FIG. 6 illustrates another example diagram 220 of the mission map 151. The diagram 220 demonstrates a graphical virtual environment of the geographic region of interest. In the example of FIG. 6, the diagram 220 demonstrates a single perspective view of the mission map 151 that can be displayed via the display system(s) 16. The mission map 151 can correspond to the mission map 151 demonstrated in the diagram 150 of the example of FIG. 4, and thus reference is likewise to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device.

Similar to the diagram 200 in the example of FIG. 6, the diagram 220 includes a portion of the layer selection controller 51, in which the "ASSETS" tab 52 has been selected to display the layer selection interface of the mission asset fields 54, demonstrated as "UAV" to correspond to the aircraft 154, as "HC" to correspond to the helicopter 156, and as "GV1" and "GV2" to correspond to each of the two ground vehicles 158, and to display the set of mission asset characteristic fields 56. In the example of FIG. 6, the selection box 60 of the mission asset characteristic field 56 corresponding to "ROUTE" has been selected, as indicated by the "X" in the respective selection box 60. Similarly, the selection box 58 of the mission asset field 54 corresponding to "UAV" has been selected, as indicated by the "X" in the respective selection box 58. As a result of the single-click selection of each of the respective selection boxes 58 and 60 corresponding to the "UAV" and "ROUTE", the selection boxes of the selection matrix 62 in the respective row and column are also automatically selected. Accordingly, in the example of FIG. 6, the graphical layers associated with the "ROUTE" mission asset characteristic field 56 of all of the mission assets are selected, and the graphical layers associated with all of the mission asset characteristics of the mission asset corresponding to the "UAV" mission asset field 54 are selected. Similar to the diagram 200 in the example of FIG. 5, in the example of FIG. 6, none of the selection boxes 110, 112, 114, and 116 associated with the mission constraints in the "CONSTRAINTS" tab 52 has been selected.

Therefore, in the example of FIG. 6, based on the "ROUTE" mission asset characteristic field 56 of all of the mission assets being selected, the diagram 220 demonstrates the flight-path 160 of the aircraft 154, the flight-path 164 of the helicopter 156, and the routes 168 of the ground vehicles 158 as being depicted on the mission map 151 via the display system(s) 16. In addition, based on the "UAV" mission asset field 56 of all of the mission assets being selected, the diagram 220 demonstrates the aircraft 154, the flight-path 162 of the aircraft 154, the waypoints 162 of the aircraft 154, and the tag 170 associated with the aircraft 154 as being depicted on the mission map 151 via the display system(s) 16. Therefore, the diagram 220 demonstrates single-click activation of the "ROUTE" mission asset characteristic field 56 and the "UAV" mission asset field 54.

In addition, the diagram 220 demonstrates selective activation of graphical layers based on clicking on the selection boxes of the selection matrix 62. In the example of FIG. 6, the diagram 220 demonstrates that the selection box corresponding to the location of the first of the ground vehicles 158 has been selected, and that the selection box corresponding to the status of the helicopter 156 has been selected. Therefore, the diagram 220 also graphically demonstrates the first of the ground vehicles 158 in the corresponding location on the map 151 of the respective geographic region of interest, and graphically demonstrates the tag 170 corresponding to the helicopter 156.

Based on the selective activation of graphical layers via the selection boxes of the selection matrix 62, a number of other graphical layers of the graphical elements 18 have thus been selectively deactivated. Thus, the diagram 220 does not depict the helicopter 156 or the waypoints 166 associated with the helicopter 156 on the map 151 based on the selection boxes of the "LOCATION" and "WAYPOINTS" fields 56 associated with the "HC" field 54 being de-selected. Similarly, the diagram 220 does not depict the second of the ground vehicles 158 or the tag 170 associated with the ground vehicles 158 based on the selection boxes of the "LOCATION" field 56 associated with the "GV2" field 54 being de-selected, and the "STATUS" field 56 associated with the "GV1" and "GV2" fields 54 being de-selected. Accordingly, the diagram 220 demonstrates that the mission asset characteristics defined by the mission asset characteristic fields 56 can be individually selected via the selection boxes of the selection matrix 62, or can be selectively de-selected after a single-click selection of one or more of the selection boxes 58 or 60 to selectively activate and deactivate the corresponding graphical layers.

Figure 7:
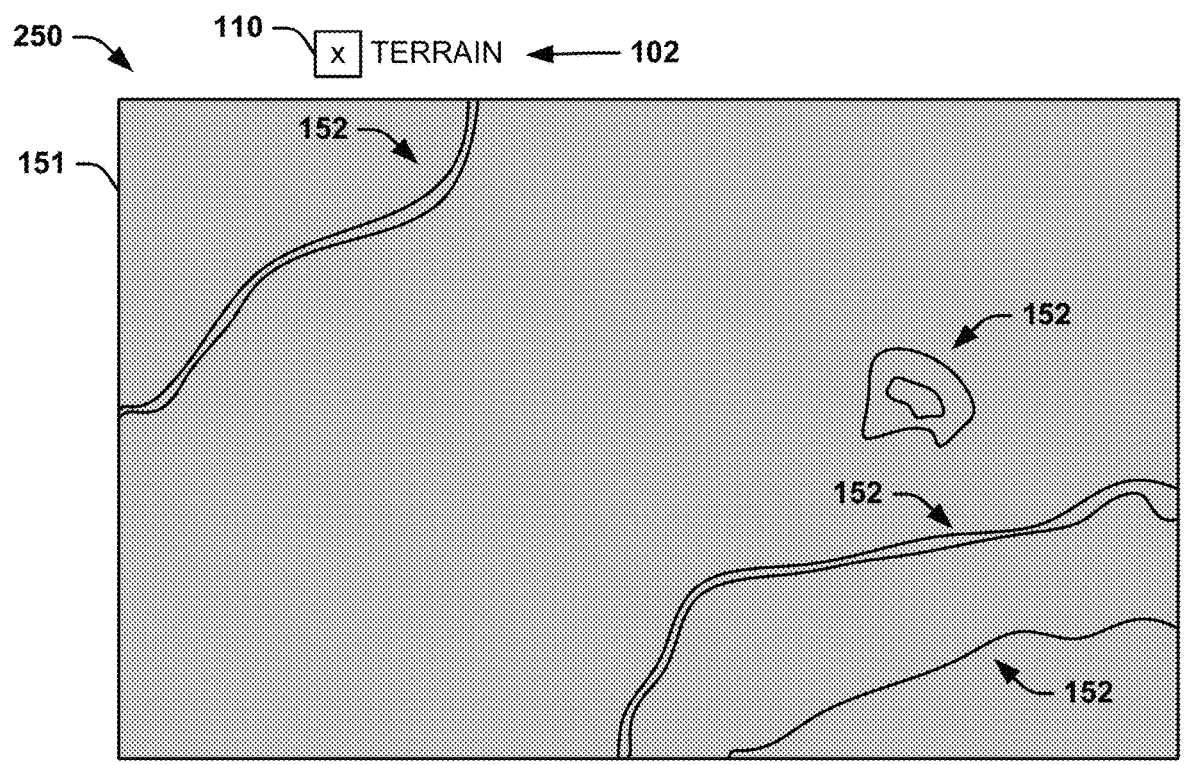
FIG. 7 illustrates yet a further example diagram of a mission map.

FIG. 7 illustrates yet another example diagram 250 of the mission map 151. The diagram 250 demonstrates a graphical virtual environment of the geographic region of interest. In the example of FIG. 7, the diagram 250 demonstrates a single perspective view of the mission map 151 that can be displayed via the display system(s) 16. The mission map 151 can correspond to the mission map 151 demonstrated in the diagram 150 of the example of FIG. 4, and thus reference is likewise to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device.

The diagram 250 includes a portion of the layer selection controller 51, in which the "CONSTRAINTS" tab 52 has been selected to display the layer selection interface of the mission constraints fields 102, 104, 106, and 108. In the example of FIG. 7, the selection box 110 of the mission constraints field 102 has been selected, as indicated by the "X" in the selection box 110. Accordingly, in the example of FIG. 7, the graphical layer associated with the terrain is selected. In addition, in the example of FIG. 7, none of the selection boxes in the selection matrix 62 associated with the mission assets in the "ASSETS" tab 52 has been selected, and none of the selection boxes 112, 114, and 116 associated with the respective mission constraint fields 104, 106, and 108 in the "CONSTRAINTS" tab 52 has been selected. Therefore, in the example of FIG. 7, the diagram 250 demonstrates that the topographical features 152 are depicted on the mission map 151 via the display system(s) 16. Thus, the diagram 250 depicts the topographical features 152 based on the selection box 110 of the "TERRAIN" mission constraint field 102 having been selected for display of the respective graphical layer.

Figure 8:
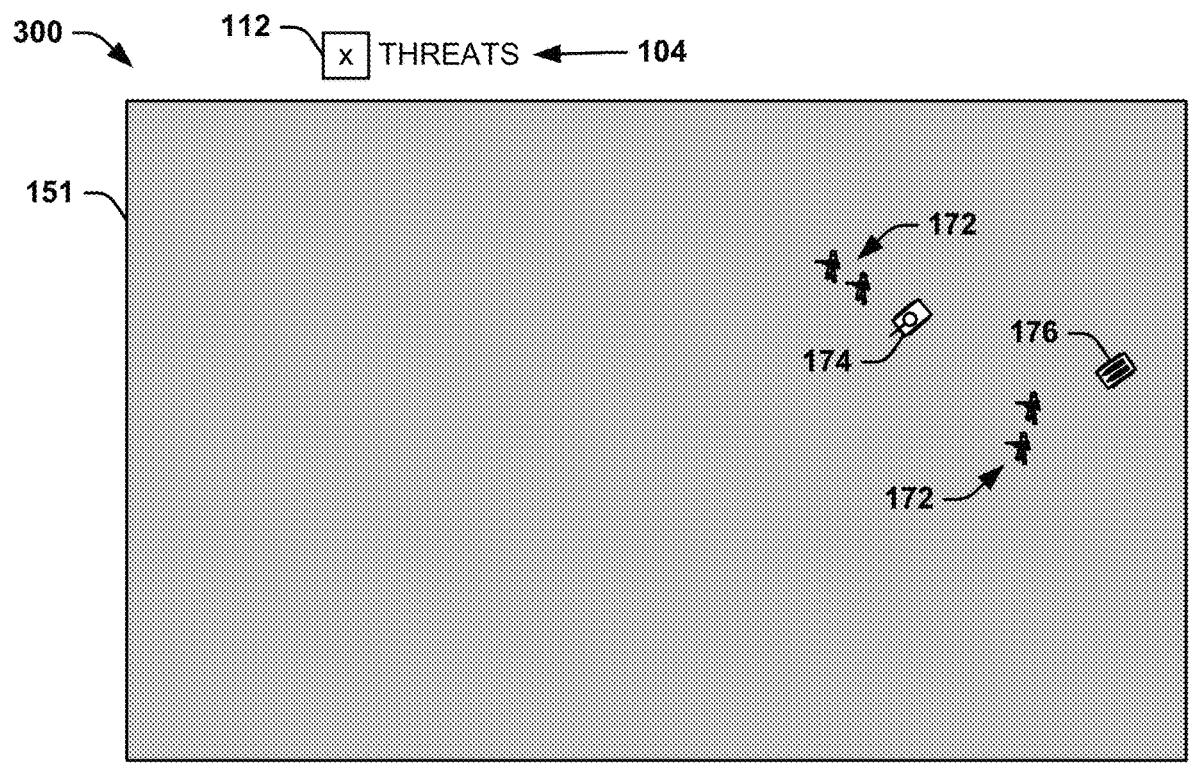
FIG. 8 illustrates yet a further example diagram of a mission map.

FIG. 8 illustrates yet another example diagram 300 of the mission map 151. The diagram 300 demonstrates a graphical virtual environment of the geographic region of interest. In the example of FIG. 8, the diagram 300 demonstrates a single perspective view of the mission map 151 that can be displayed via the display system(s) 16. The mission map 151 can correspond to the mission map 151 demonstrated in the diagram 150 of the example of FIG. 4, and thus reference is likewise to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device.

The diagram 300 includes a portion of the layer selection controller 51, in which the "CONSTRAINTS" tab 52 has been selected to display the layer selection interface of the mission constraints fields 102, 104, 106, and 108. In the example of FIG. 8, the selection box 112 of the mission constraints field 104 has been selected, as indicated by the "X" in the selection box 112. Accordingly, in the example of FIG. 8, the graphical layer associated with the threats is selected. In addition, in the example of FIG. 8, none of the selection boxes in the selection matrix 62 associated with the mission assets in the "ASSETS" tab 52 has been selected, and none of the selection boxes 110, 114, and 116 associated with the respective mission constraint fields 102, 106, and 108 in the "CONSTRAINTS" tab 52 has been selected. Therefore, in the example of FIG. 8, the diagram 300 demonstrates the ground forces 172, the first vehicle 174, and the second vehicle 176 are depicted on the mission map 151 via the display system(s) 16. Thus, the diagram 300 depicts the threats based on the selection box 112 of the "THREATS" mission constraint field 104 having been selected for display of the respective graphical layer. In addition, other information regarding the threats, such as speed and/or characteristic information regarding the ground forces 172 and the vehicles 174 and 176 can also be displayed as part of the graphical layer that includes the locations of the ground forces 172 and the vehicles 174 and 176.

Figure 9:
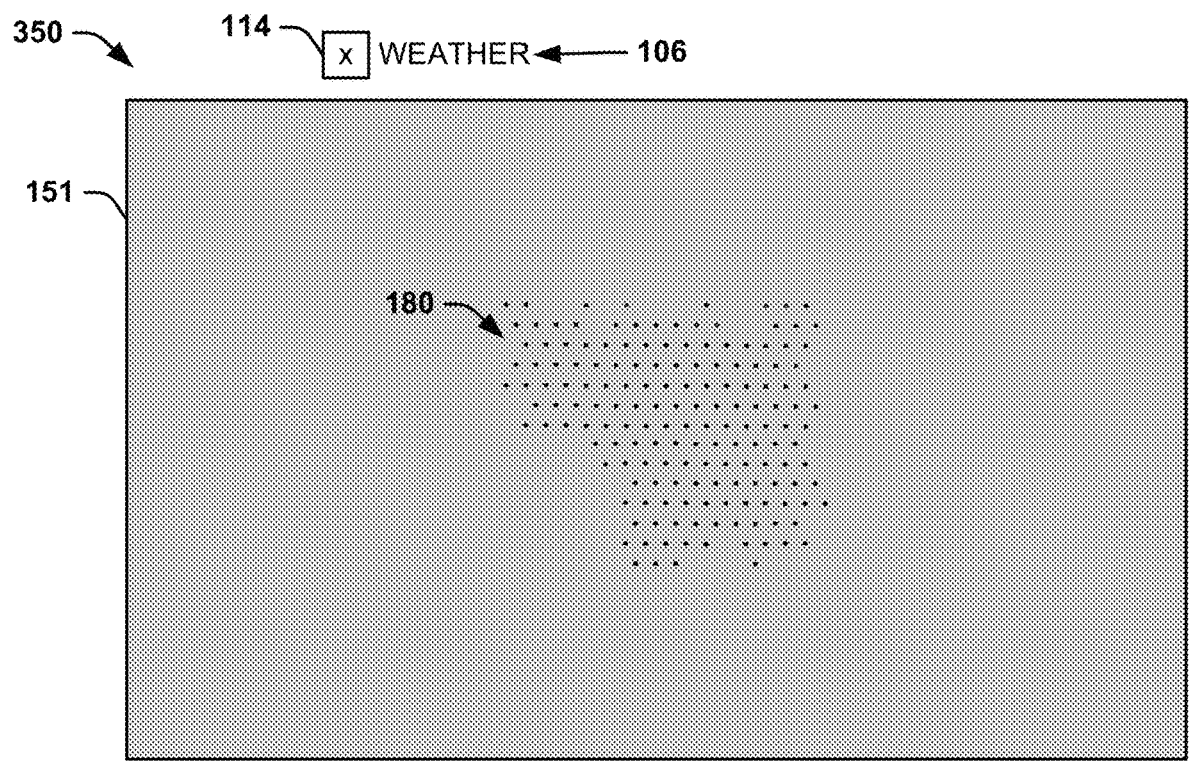
FIG. 9 illustrates yet a further example diagram of a mission map.

FIG. 9 illustrates yet another example diagram 350 of the mission map 151. The diagram 350 demonstrates a graphical virtual environment of the geographic region of interest. In the example of FIG. 9, the diagram 350 demonstrates a single perspective view of the mission map 151 that can be displayed via the display system(s) 16. The mission map 151 can correspond to the mission map 151 demonstrated in the diagram 150 of the example of FIG. 4, and thus reference is likewise to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device.

The diagram 350 includes a portion of the layer selection controller 51, in which the "CONSTRAINTS" tab 52 has been selected to display the layer selection interface of the mission constraints fields 102, 104, 106, and 108. In the example of FIG. 9, the selection box 114 of the mission constraints field 106 has been selected, as indicated by the "X" in the selection box 114. Accordingly, in the example of FIG. 9, the graphical layer associated with the weather is selected. In addition, in the example of FIG. 9, none of the selection boxes in the selection matrix 62 associated with the mission assets in the "ASSETS" tab 52 has been selected, and none of the selection boxes 110, 112, and 116 associated with the respective mission constraint fields 102, 104, and 108 in the "CONSTRAINTS" tab 52 has been selected. Therefore, in the example of FIG. 9, the diagram 350 demonstrates that the weather condition 180 is depicted on the mission map 151 via the display system(s) 16. Thus, the diagram 350 depicts the weather condition 180 based on the selection box 114 of the "WEATHER" mission constraint field 106 having been selected for display of the respective graphical layer.

Figure 10:
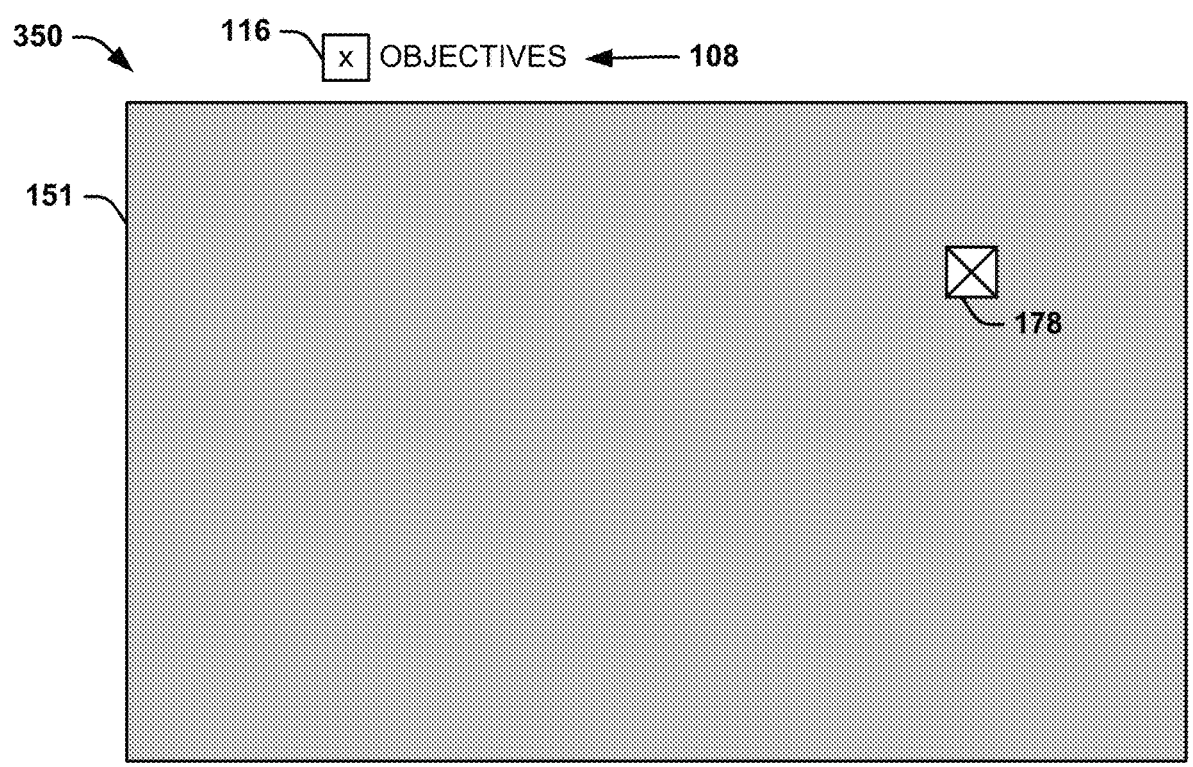
FIG. 10 illustrates yet a further example diagram of a mission map.

FIG. 10 illustrates yet another example diagram 400 of the mission map 151. The diagram 400 demonstrates a graphical virtual environment of the geographic region of interest. In the example of FIG. 10, the diagram 400 demonstrates a single perspective view of the mission map 151 that can be displayed via the display system(s) 16. The mission map 151 can correspond to the mission map 151 demonstrated in the diagram 150 of the example of FIG. 4, and thus reference is likewise to be made to the examples of FIGS. 1-3. Therefore, a user can visually monitor an actual mission in real-time as the mission occurs, or can view a simulated mission, via the display device(s) 16 of the HMI 12, and can potentially interact with the mission, such as by providing control and/or simulation inputs via a respective user interface device.

The diagram 400 includes a portion of the layer selection controller 51, in which the "CONSTRAINTS" tab 52 has been selected to display the layer selection interface of the mission constraints fields 102, 104, 106, and 108. In the example of FIG. 10, the selection box 116 of the mission constraints field 108 has been selected, as indicated by the "X" in the selection box 116. Accordingly, in the example of FIG. 10, the graphical layer associated with the objectives is selected. In addition, in the example of FIG. 10, none of the selection boxes in the selection matrix 62 associated with the mission assets in the "ASSETS" tab 52 has been selected, and none of the selection boxes 110, 112, and 114 associated with the respective mission constraint fields 102, 104, and 106 in the "CONSTRAINTS" tab 52 has been selected. Therefore, in the example of FIG. 10, the diagram 400 demonstrates that the objective 178 is depicted on the mission map 151 via the display system(s) 16. Thus, the diagram 400 depicts the objective 178 based on the selection box 116 of the "OBJECTIVES" mission constraint field 108 having been selected for display of the respective graphical layer.

Therefore, the example of FIG. 4 demonstrates selective activation of a plurality of the graphical layers, such as all of the graphical layers, to provide a complete depiction of the simulated mission or the actual mission in real-time in the geographic region of interest. Additionally, the examples of FIGS. 5-9 demonstrate the selective activation of one or more graphical layers, and thus the selective deactivation of one or more of the graphical layers, for demonstration of a portion of the simulated mission or the actual mission in real-time in the geographic region of interest. Based on the selective activation and deactivation of the graphical layers, users of the mission monitoring system 10 can implement contextual differentiation in monitoring the mission. The contextual differentiation allows for coarse-grained control of the mission based on controlling the display of specific layer types or layer contexts, as well as fine-grained control on multiple layer types and contexts. As another example, by implementing layer control of the mission assets via the selection matrix 62, layer management of the mission assets and associated characteristics can greatly reduce the required operator workload to execute the same operation relative to traditional display schemes, and allows for highly scalable expansion in adding additional mission assets and corresponding layers. Therefore, the mission monitoring system 10 can provide for more rapid and intuitive layer control of a very large number of mission assets and associated characteristics.

Figure 11:
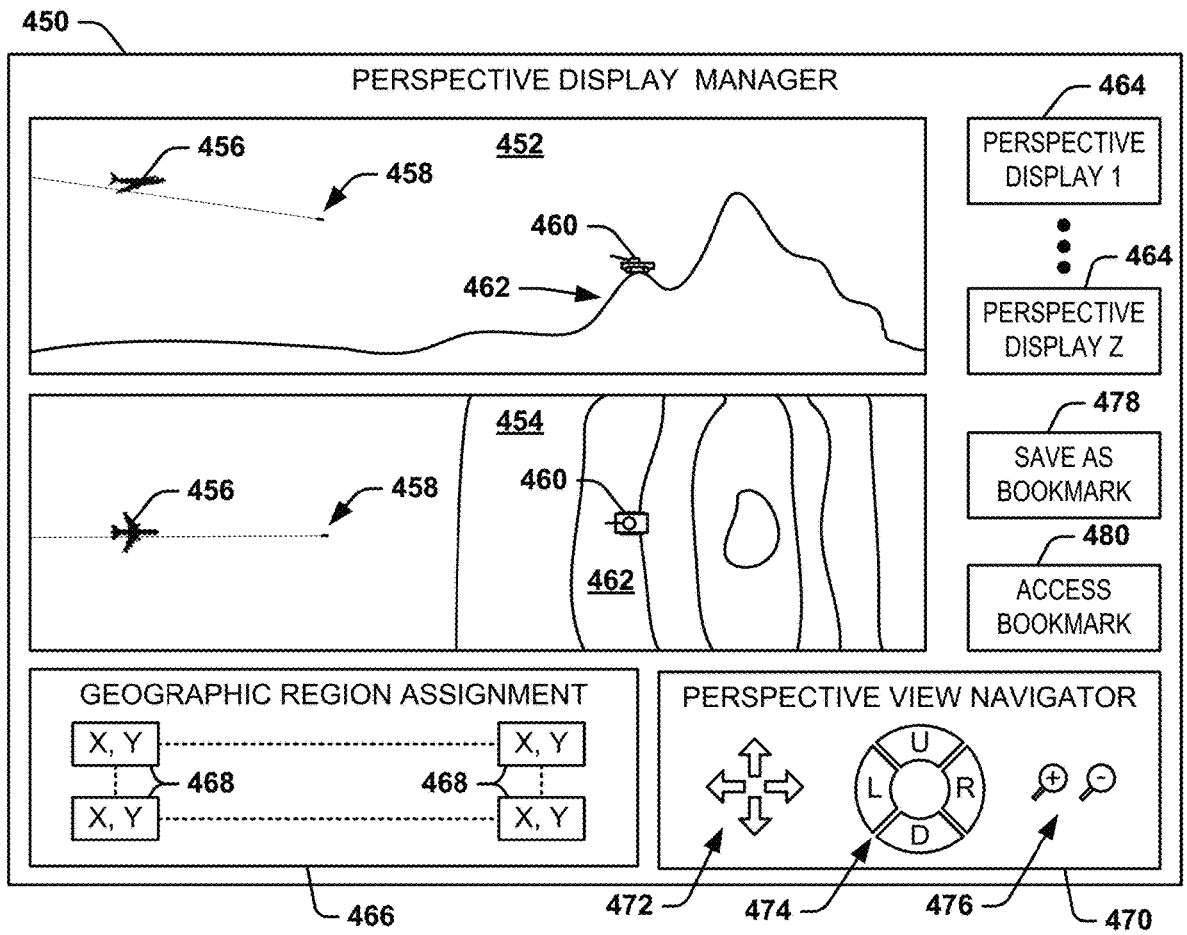
FIG. 11 illustrates an example of a perspective display manager.

FIG. 11 illustrates an example of a perspective display manager 450. The perspective display manager 450 can correspond to the perspective display manager 24 in the example of FIG. 1. Therefore, reference is to be made to the example of FIG. 1 in the following description of the example of FIG. 11.

The perspective display manager 450 is demonstrated in the example of FIG. 11 as including a first perspective display 452 and a second perspective display 454. As described herein, the term "perspective display" describes display of the graphical virtual environment via the display system(s) 16 at a given perspective view. As an example, the first and second perspective displays 452 and 454 can be associated with the display system(s) 16, such that the perspective display manager 450 and the display system(s) 16 can cooperate and/or be substantially combined. Each of the first and second perspective displays 452 and 454 are demonstrated as displaying a graphical virtual environment of a portion of the geographic region of interest in different perspective views. In each of the first and second perspective displays 452 and 454, an aircraft 456 is demonstrated as launching ordnance 458 at a target vehicle 460 that is located on a topographical terrain feature 462. In the example of FIG. 11, the first perspective display 452 is demonstrated as displaying the aircraft 456 launching the ordnance 458 at the target vehicle 460 in a sideways perspective view, while the second perspective display 454 is demonstrated as displaying the aircraft 456 launching the ordnance 458 at the target vehicle 460 in an overhead perspective view. As an example, the separate portions of the geographic region of interest can be displayed concurrently in real-time in the separate perspective views. Therefore, the perspective view manger 450 is configured to provide separate respective perspective views of the graphical virtual environment concurrently, either in simulation or in real-time. As an example, the first and second perspective displays 452 and 454 can be provided in separate display monitors, or can be separate windows on a common display monitor.

In the example of FIG. 11, the perspective display manager 450 also includes perspective display controls. The perspective display controls include perspective display selection controls 464 that are configured to enable selection of one of a plurality Z of perspective displays, where Z is a positive integer. As an example, the perspective display controls 464 can be configured to enable selection of one of the separate perspective display (e.g., the first and second displays 452 and 454), such as to enable navigation in the graphical virtual environment, editing, and/or control of the respective perspective display. For example, one of the first and second displays 452 and 454 can be selected for layer control, such that a user can selectively activate and deactivate the graphical layers associated with the graphical elements 18 independently of each other using the layer selection controller 32.

The perspective display manager 450 also includes a geographic region assignment controller 466 configured to allow a user to define dimensions associated with graphical virtual environment of the geographic region of interest. As an example, the geographic region assignment controller 466 can allow a user to define a geographic sub-region of the geographic region of interest to define the graphical virtual environment for a given display (e.g., the displays 452 and 454). In the example of FIG. 11, the geographic region assignment controller 466 includes boundary coordinate inputs 468 in which the user(s) can define coordinates, such as latitude and longitude coordinates, to act as vertices of a polygonal area of the geographic region of interest to define the graphical virtual environment associated with the generated geographic sub-region of interest. In response to receiving the user inputs to define the geographic sub-region of interest, the perspective display manager 450 can access the map data 20 from the memory 14 to generate the graphical virtual environment of the geographic sub-region of interest. Thus, the graphical virtual environment of the geographic sub-region of interest can be provided as a given one or more of the perspective displays (e.g., the first and/or the second displays 452 and 454) with which the user(s) can interact.

The perspective display manager 450 also includes a perspective view navigator 470 configured to enable a user to navigate through the graphical virtual environment. For example, the perspective view navigator 470 can enable the user to change the perspective view corresponding to the viewing perspective of the user at a given virtual location within the graphical virtual environment. In the example of FIG. 11, the perspective view navigator 470 allows the user to manipulate the perspective view in a given selected perspective display (e.g., as selected via the perspective display selection controls 464). For example, the perspective view navigator 470 includes a set of direction arrows 472 to allow the user to move in three-dimensional space (e.g., forward, backward, left, and right) in the graphical virtual environment, and yaw and pitch directional controls 474 to allow the user to change the viewing perspective of the user in the graphical virtual environment. The perspective view navigator 470 also includes zoom controls 476 to zoom-in and zoom-out the perspective view, and thus change the offset distance of the virtual location in the graphical virtual environment. Therefore, the user can move to substantially any virtual location in three-dimensional space in the graphical virtual environment to simulate being located in any point in three-dimensional space with respect to the graphical virtual environment of the geographic region of interest.

In addition, the perspective view controls include a save bookmark feature 478 and an access bookmark feature 480. For example, the user(s) can implement the save bookmark feature 478 to save a given perspective display (e.g., in the memory 14), such as a perspective display that has been selected via the perspective display selection controls 464. Thus, the saved perspective display can be subsequently accessed via the access bookmark feature 468. The saved and accessed perspective display can correspond to a one of the perspective displays at a given perspective view of a given portion of the graphical virtual environment, and/or can correspond to an entirely different portion of the graphical virtual environment corresponding to a different portion of the geographic region of interest. Thus, a user can quickly recall one of the perspective displays to be displayed via the display system(s) 16 (e.g., one of the perspective displays 452 and 454) in real-time, instead of having to navigate back to a respective portion of the graphical virtual environment that corresponds to an important portion of the mission. Therefore, the save bookmark feature 478 and an access bookmark feature 480 can provide rapid monitoring of a variety of disparate portions of the geographic region of interest.

Figure 12:
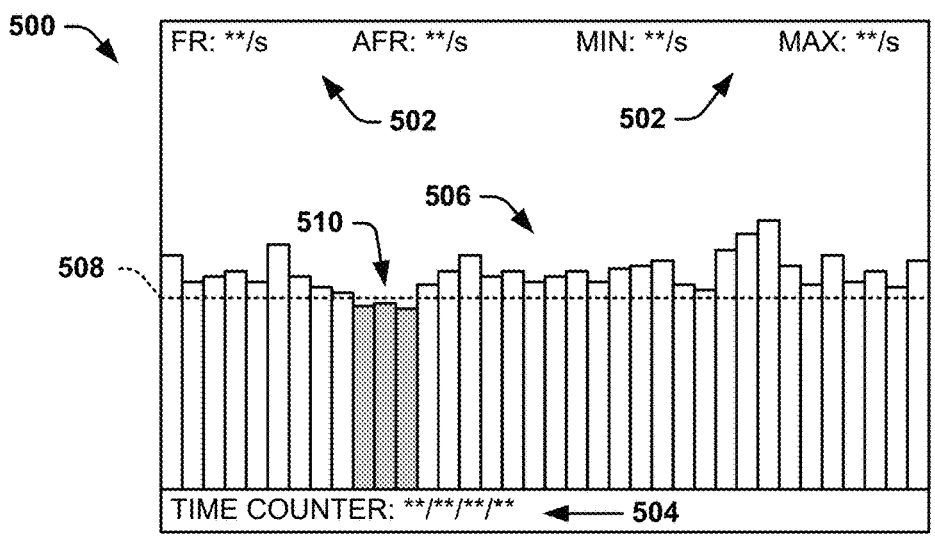
FIG. 12 illustrates an example of a performance monitor display.

FIG. 12 illustrates an example of a performance monitor display 500. The performance monitor display 500 can correspond to a portion of the performance monitor 36 in the example of FIG. 1. As an example, the performance monitor display 500 can be provided as a widget that is accessible from the display system(s) 16, or can operate substantially continuously in the display system(s) 16. Therefore, reference is to be made to the example of FIG. 1 in the following description of the example of FIG. 12.

The performance monitor display 500 can be configured to graphical display the graphical rendering rate of one or more of the display system(s) 16 in real-time. In the example of FIG. 12, the performance monitor display 500 demonstrates rendering rate statistics at 502, such as including a frame rate ("FR"), an average frame rate ("AFR"), a minimum frame rate ("MIN"), and a maximum frame rate ("MAX"), in frames per second ("/s"). The performance monitor display 500 also includes a time counter 504 to provide display of the real-time, such as from a clock or other reliable time source (e.g., an atomic clock). Furthermore, the performance monitor display 500 includes a histogram graph 506 that provides a frame rate at each second, demonstrated in the example of FIG. 12 as a bar-graph that graphically depicts the number of frames of rendering in each consecutive second of operation of the display system(s) 16** in real-time.

In the example of FIG. 12, the performance monitor display 500 can demonstrate a programmable threshold 508 corresponding to a minimum acceptable rendering rate of the display system(s) 16. As an example, the programmable threshold 508 can be selected as a minimum number of frames per second of rendering that corresponds to a substantial minimum acceptable lag of display of the display system(s) 16 in real-time. For example, in a time-sensitive mission, it may be highly necessary for a user or operator of a mission asset to be able to quickly react to unexpected circumstances. Therefore, a lag in the display system(s) 16 may be unacceptable based on a potential loss of mission assets from unexpected threats. Accordingly, the performance monitor display 500 can provide an indication of a rendering rate that is less than the programmable threshold 508, demonstrated in the example of FIG. 12 based on the shaded portion of the histogram graph 506. In addition to the programmable threshold 508, the performance monitor display 500 can include additional graphical displays of rendering statistics, such as the average frame rate, an optimal frame rate, or any of a variety of other graphical representations of the performance of the graphics processor(s) 22.

For example, in response to the rendering rate falling below the programmable threshold 508, such as demonstrated at 510 with the shaded bars of the histogram graph 506, the performance monitor display 500 can provide at least one of a visual and audial alarm to indicate potential lag in the display system(s) 16 to the user(s) of the HMI 12. As an example, the rendering rate of the display system(s) 16 can be a function of the number of graphical layers and amount of graphical content on the graphical layers that are superimposed on the graphical virtual environment via the graphics processor(s) 22. Therefore, the performance monitor display 500 can provide an indication to the user(s) of the HMI 12 to begin selective deactivation of graphical layers, such as those that are tactically unnecessary at a critical phase of the mission, to maintain real-time updating of the mission via the display system(s) 16. Accordingly, the performance monitor display 500 can facilitate rendering rate feedback to the user(s) in real-time to be used in conjunction with the layer selection controller 32 to maintain accurate and timely monitoring of the mission.

Figure 13:
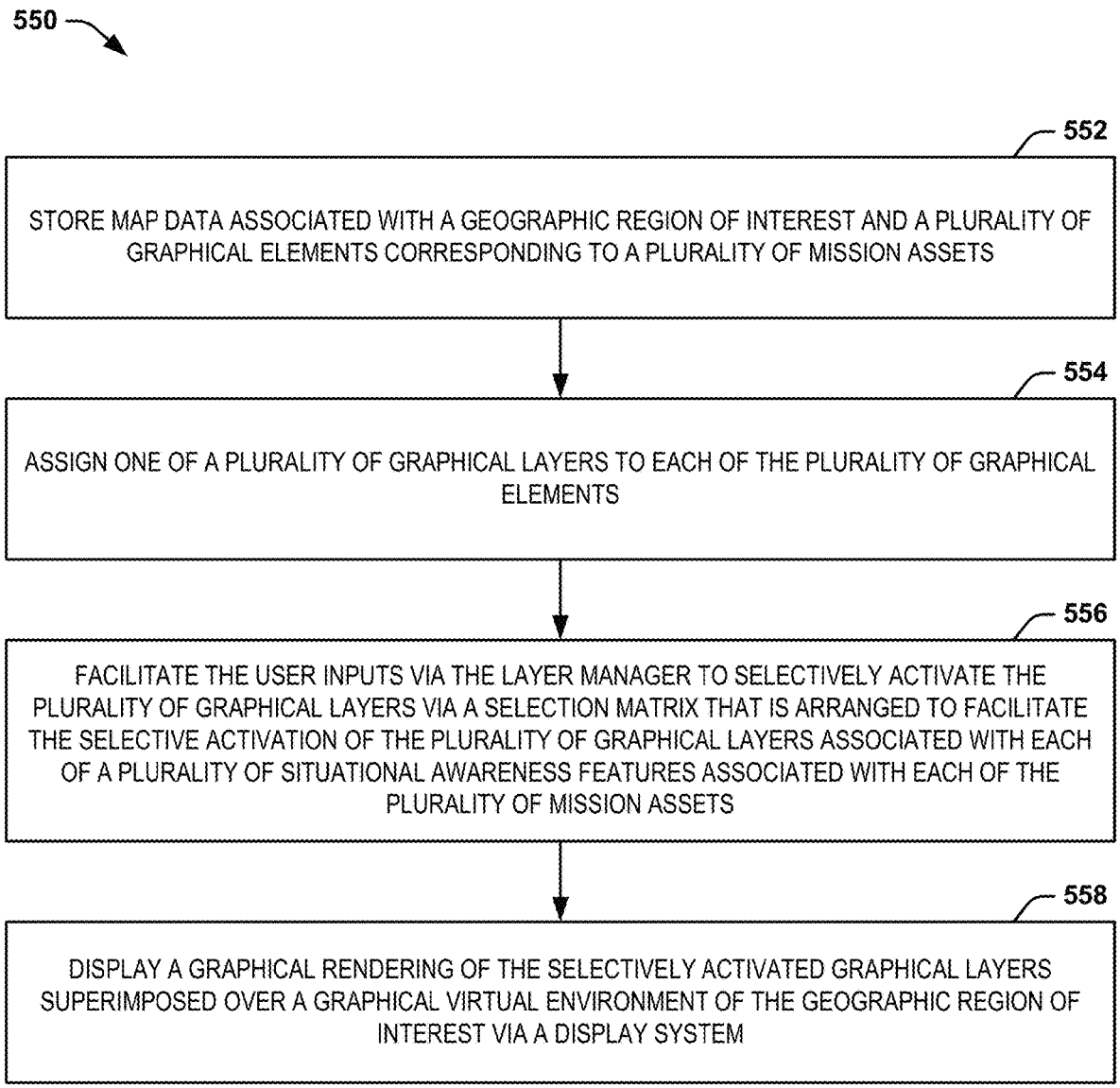
FIG. 13 illustrates an example of a method for displaying a mission.

In view of the foregoing structural and functional features described above, a methodology in accordance with various aspects of the example embodiments will be better appreciated with reference to FIG. 13. While, for purposes of simplicity of explanation, the methodology of FIG. 13 is shown and described as executing serially, it is to be understood and appreciated that the example embodiments are not limited by the illustrated order, as some aspects could, in accordance with the example embodiments, occur in different orders and/or concurrently with other aspects from that shown and described herein. Moreover, not all illustrated features may be required to implement a methodology in accordance with an aspect of the example embodiments.

FIG. 13 illustrates an example of a method 550 for displaying a mission. At 552, map data (e.g., the map data 20) associated with a geographic region of interest and a plurality of graphical elements (e.g., the graphical elements 18) corresponding to a plurality of mission assets are stored. At 554, one of a plurality of graphical layers is assigned to each of the plurality of graphical elements. At 556, user inputs are facilitated via a layer manager (e.g., the layer manager 30) to selectively activate the plurality of graphical layers via a selection matrix (e.g., the selection matrix 62) that is arranged to facilitate the selective activation of the plurality of graphical layers associated with each of a plurality of situational awareness features associated with each of the plurality of mission assets. At 558, displaying a graphical rendering of the selectively activated graphical layers superimposed over a graphical virtual environment of the geographic region of interest via a display system (e.g., the display system(s) 16).

What have been described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, the example embodiments are intended to embrace all such alterations, modifications and variations that fall within the spirit and scope of the appended claims.

What is claimed is:

1. A mission monitoring system comprising:
   a data store to store map data associated with a geographic region of interest and a plurality of graphical elements corresponding to at least one mission asset and to mission constraints, wherein each of the plurality of graphical elements comprises a layer assignment associated with one of a plurality of graphical layers;
   a human-machine interface (HMI) to facilitate user inputs to selectively activate the plurality of graphical layers associated with the plurality of graphical elements and to display a graphical rendering of the selectively activated graphical layers superimposed over a graphical virtual environment of the geographic region of interest via a display system; and
   a performance monitor to provide graphical feedback of the graphical rendering rate of the display system based on the selective activation and deactivation of the plurality of graphical layers associated with the plurality of graphical elements.

2. The system of claim 1, wherein the HMI comprises a layer manager to facilitate the user inputs for selective activation of the plurality of graphical layers associated with the plurality of graphical elements comprising the at least one mission asset, characteristics of the at least one mission asset, and the mission constraints associated with the geographic region of interest.

3. The system of claim 2, wherein the at least one mission asset comprises a plurality of mission assets, wherein the layer manager comprises a selection matrix that is arranged to facilitate selective activation of the plurality of graphical layers associated with each of a plurality of situational awareness features associated with each of the plurality of mission assets, and to provide single-click selection of all of the plurality of mission assets for a single one of the plurality of situational awareness features and single-click selection of all of the plurality of situational awareness features for a single one of the plurality of mission assets.

4. The system of claim 2, wherein the layer manager further to facilitate the user inputs for selective activation of the plurality of graphical layers associated with the characteristics of the at least one mission asset comprising at least one of location in the geographic region of interest, route, waypoints, and status.

5. The system of claim 2, wherein the layer manager further to facilitate the user inputs for selective activation of the plurality of graphical layers associated with the mission constraints comprising a separate one of the plurality of layers corresponding to at least one of terrain, threats, weather, and mission objectives, respectively.

6. The system of claim 1, wherein the HMI comprises a perspective display manager to facilitate the user inputs to change a perspective view in three-dimensional space of the graphical rendering of the selectively activated graphical layers superimposed over the graphical virtual environment of the geographic region of interest on the display system, wherein the perspective display manager comprises a bookmark save-and-access feature configured to facilitate saving the perspective view for subsequent access to be displayed via the display system.

7. The system of claim 6, wherein the perspective display manager further to facilitate display of a plurality of perspective views in three-dimensional space of the graphical rendering of the selectively activated graphical layers superimposed over the graphical virtual environment of the geographic region of interest concurrently via a respective plurality of perspective displays of the display system.

8. The system of claim 6, wherein the perspective display manager further comprises a geographic region assignment controller to facilitate the user inputs to define dimensions associated with graphical virtual environment of the geographic region of interest based on the map data.

9. The system of claim 1, wherein the graphical feedback is a histogram with respect to the graphical rendering rate of the display system and the graphical feedback of the graphical rendering rate of the display system is relative to at least one threshold associated with an acceptable range of operation of the display system.

10. A method for displaying a mission, the method comprising:
storing map data associated with a geographic region of interest and a plurality of graphical elements corresponding to a plurality of mission assets;
assigning one of a plurality of graphical layers to each of the plurality of graphical elements;
facilitating the user inputs via the layer manager to selectively activate the plurality of graphical layers via a selection matrix that is arranged to facilitate the selective activation of the plurality of graphical layers associated with each of a plurality of situational awareness features associated with each of the plurality of mission assets;
displaying a graphical rendering of the selectively activated graphical layers superimposed over a graphical virtual environment of the geographic region of interest via a display system;
changing a perspective view in three-dimensional space of the graphical rendering of the selectively activated graphical layers superimposed over the graphical virtual environment of the geographic region of interest on the display system; and
monitoring a graphical rendering rate of the display system relative to at least one threshold associated with an acceptable range of operation of the display system with respect to the graphical rendering rate of the display system in a feedback manner in response to the selective activation and deactivation of the plurality of graphical layers associated with the plurality of graphical elements.

11. The method of claim 10, wherein facilitating the user inputs comprises:
providing single-click selection of all of the plurality of mission assets for a single one of the plurality of situational awareness features; and
providing single-click selection of all of the plurality of situational awareness features for a single one of the plurality of mission assets.

12. The method of claim 10, wherein facilitating the user inputs comprises facilitating user inputs via the layer manager to selectively activate the plurality of graphical layers associated with at least one of location in the geographic region of interest, route, waypoints, and status associated with the plurality of mission assets.

13. The method of claim 10, wherein storing the plurality of graphical elements comprises storing the plurality of graphical elements corresponding to a plurality of mission constraints corresponding to at least one of terrain, threats, weather, and mission objectives, the method further comprising:
assigning one of the plurality of graphical layers to each of the plurality of graphical elements corresponding to the plurality of mission constraints; and
facilitating the user inputs via the layer manager to selectively activate the plurality of graphical layers associated with the plurality of mission constraints.

14. The method of claim 10, wherein displaying the graphical rendering comprises displaying a plurality of perspective views in three-dimensional space of the graphical rendering of the selectively activated graphical layers superimposed over the graphical virtual environment of the geographic region of interest concurrently via a respective plurality of perspective displays of the display system.

15. The method of claim 10, further comprising receiving situational awareness data associated with the plurality of mission assets via a receiver, wherein storing the plurality of graphical elements comprises storing the plurality of graphical elements corresponding to the plurality of situational awareness features associated with the plurality of mission assets based on the situational awareness data associated with the plurality of mission assets.

16. A mission monitoring system comprising:
a receiver to receive situational awareness data associated with at least one mission asset;
a data store to store map data associated with a geographic region of interest and a plurality of graphical elements corresponding to at least one mission asset, characteristics associated with the situational awareness data, and to mission constraints, wherein each of the plurality of graphical elements comprises a layer assignment associated with one of a plurality of graphical layers; and a human-machine interface (HMI) comprising:

a layer manager to facilitate user inputs to selectively activate the plurality of graphical layers associated with the plurality of graphical elements;

a display system to display a graphical rendering of the selectively activated graphical layers superimposed over a graphical virtual environment of the geographic region of interest; and a performance monitor as a histogram with respect to the graphical rendering rate of the display system to provide graphical feedback of the graphical rendering rate of the display system relative to at least one threshold associated with an acceptable range of operation of the display system based on the selective activation and deactivation of the plurality of graphical layers associated with the plurality of graphical elements.

17. The system of claim 16, wherein the at least one mission asset comprises a plurality of mission assets, wherein the layer manager comprises a selection matrix that is arranged to facilitate selective activation of the plurality of graphical layers associated with each of a plurality of situational awareness features associated with each of the plurality of mission assets, and to provide single-click selection of all of the plurality of mission assets for a single one of the plurality of situational awareness features and single-click selection of all of the plurality of situational awareness features for a single one of the plurality of mission assets.

18. The system of claim 16, wherein the HMI further comprises a perspective display manager to facilitate the user inputs to change a perspective view in three-dimensional space of the graphical rendering of the selectively activated graphical layers superimposed over the graphical virtual environment of the geographic region of interest on the display system, wherein the perspective display manager comprises a bookmark save-and-access feature configured to facilitate saving the perspective view for subsequent access to be displayed via the display system, the perspective display manager being further configured to facilitate display of a plurality of perspective views in three-dimensional space of the graphical rendering of the selectively activated graphical layers superimposed over the graphical virtual environment of the geographic region of interest concurrently via a respective plurality of perspective displays of the display system.

* * * * *